(12) United States Patent
Kuroda et al.

(10) Patent No.: US 6,633,723 B1
(45) Date of Patent: Oct. 14, 2003

(54) RECORDING AND REPRODUCING SYSTEM, RECORDING APPARATUS AND REPRODUCING APPARATUS HAVING COPY PROTECTION FUNCTION

(75) Inventors: Kazuo Kuroda, Saitama-Ken (JP); Toshio Suzuki, Saitama-Ken (JP); Yoshiaki Moriyama, Saitama-Ken (JP); Kazumi Sugaya, Saitama-Ken (JP)

(73) Assignee: Pioneer Electric Corporation, Tokyo-To (JP)

( * ) Notice: Subject to any disclaimer, the term of this patent is extended or adjusted under 35 U.S.C. 154(b) by 0 days.

(21) Appl. No.: 09/346,748

(22) Filed: Jul. 2, 1999

(30) Foreign Application Priority Data

Jul. 3, 1998 (JP) ......................................... P10-204328

(51) Int. Cl.[7] .............................................. H04N 5/91
(52) U.S. Cl. ........................................... 386/94; 386/95
(58) Field of Search ............................ 386/46, 94, 95, 386/124; 380/203; 713/160

(56) References Cited

U.S. PATENT DOCUMENTS 5,987,126 A * 11/1999 Okuyama et al. ........... 380/203
6,047,103 A * 4/2000 Yamauchi et al. ............ 386/94
6,223,285 B1 * 4/2001 Komuro et al. ............. 713/160
6,298,196 B1 * 10/2001 Shima et al. ................. 386/94

* cited by examiner

Primary Examiner—Huy Nguyen
(74) Attorney, Agent, or Firm—Young & Thompson

(57) ABSTRACT

A system comprising a recording apparatus for recording record information onto a recording medium and a reproducing apparatus for reading the record information from the recording medium and outputting it to reproduce, is provided. The record information includes: image information; a first identification information which represents any one of never copy, one copy and copy free; and a second identification information which represents either the never copy or the one copy. The never copy indicates copying is prohibited. The one copy indicates copying is once permitted. The copy free indicates copying is permitted. The recording apparatus controls recording the record information, and determines whether or not the record information is to be encrypted based upon the first identification information and the second identification information. The reproducing apparatus controls outputting the record information based upon the first identification information and whether the record information has been encrypted or not.

27 Claims, 12 Drawing Sheets

FIG.5

| | DETERMINATION | | CONTROL |
|---|---|---|---|
| | WATERMARK | TYPES OF EXTERNAL APPARATUS | PERMISSION/PROHIBITION OF DIGITAL OUTPUT |
| 1 | NEVER COPY | AUTHORIZED APPARATUS | PERMISSION |
| 2 | | UNAUTHORIZED APPARATUS | PROHIBITION |
| 3 | ONE COPY | AUTHORIZED APPARATUS | PERMISSION |
| 4 | | UNAUTHORIZED APPARATUS | PROHIBITION |
| 5 | COPY-FREE | DETERMINATION IS NOT CARRIED OUT | PERMISSION |

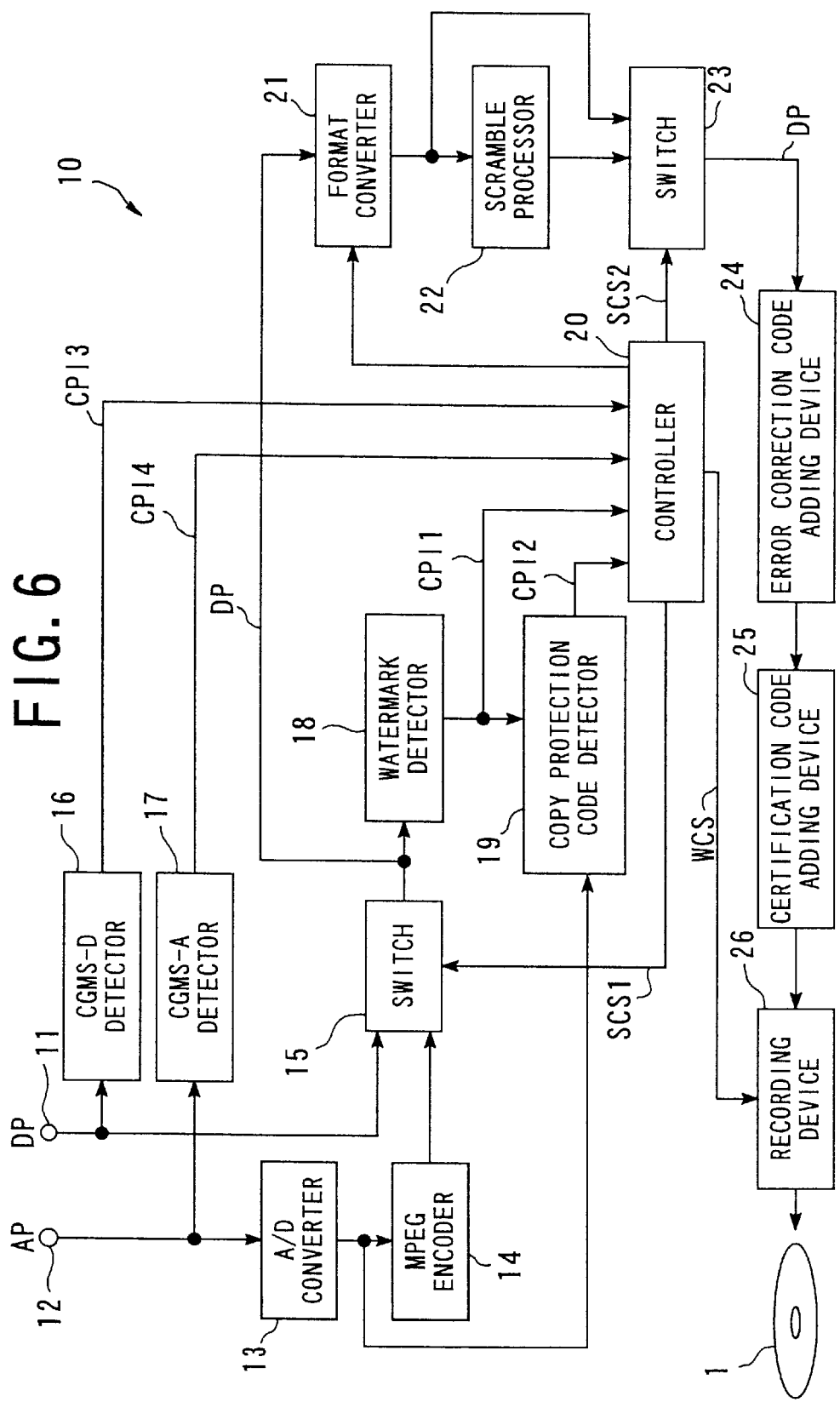

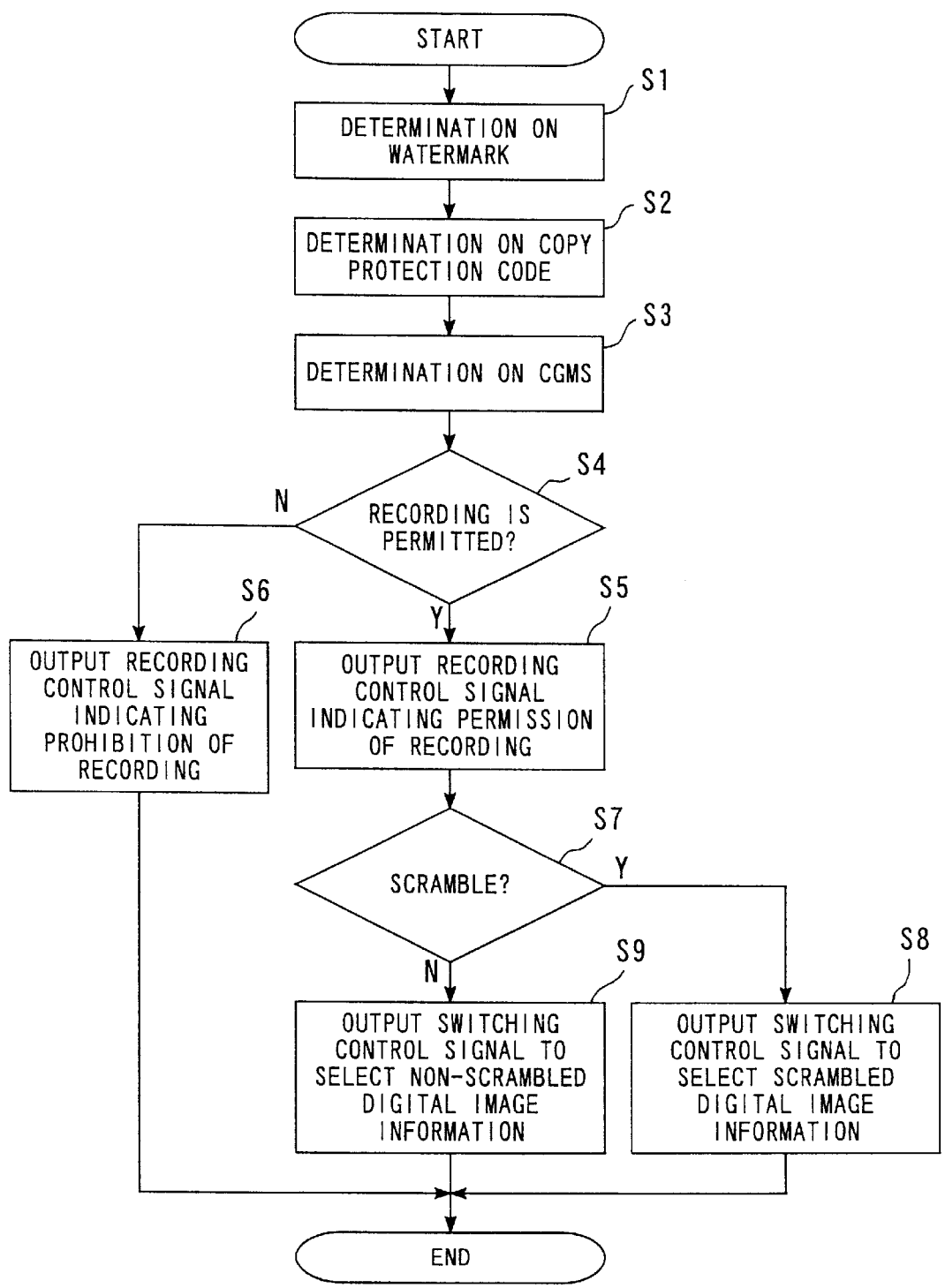

FIG. 8

| | DETERMINATION | | | CONTROL | |
|---|---|---|---|---|---|
| | WATERMARK | COPY PROTECTION CODE | CGMS | RECORDING CONTROL SIGNAL | SCRAMBLE |
| 1 | NEVER COPY | DETERMINATION IS NOT CARRIED OUT | DETERMINATION IS NOT CARRIED OUT | PROHIBITION OF RECORDING | — |
| 2 | | NO MORE COPY | DETERMINATION IS NOT CARRIED OUT | PROHIBITION OF RECORDING | — |
| 3 | | ONE COPY | NEVER COPY | PROHIBITION OF RECORDING | — |
| 4 | ONE COPY | | ONE COPY | PERMISSION OF RECORDING | SCRAMBLE |
| 5 | | | COPY-FREE | PROHIBITION OF RECORDING | — |
| 6 | COPY-FREE (ABSENCE) | DETERMINATION IS NOT CARRIED OUT | NEVER COPY | PROHIBITION OF RECORDING | — |
| 7 | | | ONE COPY | PROHIBITION OF RECORDING | — |
| 8 | | | COPY-FREE | PERMISSION OF RECORDING | NON-SCRAMBLE |

FIG.11A

| | WATERMARK | CGMS | DETERMINATION | | |
|---|---|---|---|---|---|
| | | | SCRAMBLE | CERTIFICATION CODE | TYPES OF EXTERNAL APPARATUS |
| 1 | NEVER COPY | NEVER COPY | SCRAMBLE | DETERMINATION IS NOT CARRIED OUT | DETERMINATION IS NOT CARRIED OUT |
| 2 | | | NON-SCRAMBLE | PRESENCE | UNAUTHORIZED APPARATUS |
| 3 | | | NON-SCRAMBLE | ABSENCE | AUTHORIZED APPARATUS |
| 4 | | ONE COPY | DETERMINATION IS NOT CARRIED OUT | DETERMINATION IS NOT CARRIED OUT | DETERMINATION IS NOT CARRIED OUT |
| 5 | | COPY-FREE | | | |
| 6 | | | | PRESENCE | UNAUTHORIZED APPARATUS |
| 7 | | | | ABSENCE | AUTHORIZED APPARATUS |
| 8 | ONE COPY | NEVER COPY | SCRAMBLE | | |
| 9 | | | NON-SCRAMBLE | DETERMINATION IS NOT CARRIED OUT | DETERMINATION IS NOT CARRIED OUT |
| 10 | | ONE COPY | DETERMINATION IS NOT CARRIED OUT | DETERMINATION IS NOT CARRIED OUT | DETERMINATION IS NOT CARRIED OUT |
| 11 | | COPY-FREE | SCRAMBLE | | |
| 12 | | | NON-SCRAMBLE | | |
| 13 | COPY-FREE (ABSENCE) | NEVER COPY | NON-SCRAMBLE | PRESENCE | UNAUTHORIZED APPARATUS |
| 14 | | | | ABSENCE | AUTHORIZED APPARATUS |
| 15 | | ONE COPY | DETERMINATION IS NOT CARRIED OUT | DETERMINATION IS NOT CARRIED OUT | DETERMINATION IS NOT CARRIED OUT |
| 16 | | COPY-FREE | SCRAMBLE | | |
| 17 | | | NON-SCRAMBLE | | |

FIG.11B

| | READING CONTROL SIGNAL (PERMISSION/PROHIBITION OF READING) | CONTROL DIGITAL OUTPUT | COPY PROTECTION CODE |
|---|---|---|---|
| 1 | PROHIBITION | — | — |
| 2 | | | — |
| 3 | PERMISSION | PROHIBITION | — |
| 4 | | PERMISSION | — |
| 5 | PROHIBITION | — | — |
| 6 | | | — |
| 7 | PERMISSION | PROHIBITION | REWRITE |
| 8 | | PERMISSION | REWRITE |
| 9 | PROHIBITION | — | — |
| 10 | | | — |
| 11 | PROHIBITION | | — |
| 12 | | | — |
| 13 | PERMISSION | PROHIBITION | — |
| 14 | | PERMISSION | — |
| 15 | PROHIBITION | | — |
| 16 | | | — |
| 17 | PROHIBITION | | — |
| 18 | | | — |
| 19 | PERMISSION | PERMISSION | — |

RECORDING AND REPRODUCING SYSTEM, RECORDING APPARATUS AND REPRODUCING APPARATUS HAVING COPY PROTECTION FUNCTION

BACKGROUND OF THE INVENTION

1. Field of the Invention

The present invention relates to a recording and reproducing system for recording and reproducing image information onto and from a recording medium such as a DVD or the like, and relates, more particularly, to a recording and reproducing system equipped with a copy protection function of restricting copying of image information such as picture or the like and a recording apparatus and a reproducing apparatus suitable for use in this recording and reproducing system.

2. Description of the Related Art

A DVD is a recording medium having a large recording capacity, and can record, for example, digital video information equivalent to one volume of moving picture film. Because of this large capacity, a DVD has come to be distributed as an image recording medium for replacing a video cassette of VHS system. A DVD exists in two types; a DVD onto which a recording or a rewriting cannot be done (It is referred to as a "read-only DVD", hereinafter.), and a DVD onto which a recording or a rewriting can be done (It is referred to as a "recordable DVD", hereinafter.). When a recordable DVD is used, it is possible to digitally copy the whole content of a moving picture recorded on the DVD.

Along with the distribution of the recordable DVD, there has been developed a system for digitally transmitting a moving picture or the like from a broadcasting station to general subscribers. When this system has been achieved, it becomes possible for subscribers to not only enjoy watching a high-definition moving picture at home but also digitally record the moving picture transmitted from the broadcasting station onto a DVD and prepare a replica disk in an easy manner.

On the other hand, the act of copying a moving picture or the like without permission is restricted by the copyright law, etc. Particularly, when a moving picture or the like is copied digitally, there occurs no quality degradation in the moving picture copied. Accordingly, it is necessary to severely restrict the copying of digital video information using a DVD in order to promote the distribution of DVD as well.

In order to restrict the recording or copying of digital video information, various methods have been proposed. For example, there is proposed a method of embedding identification information for restricting the copying into digital video information at the time of recording the digital video information onto a DVD. Such a system is generally called a CGMS (Copy Generation Management System). This identification information represents one of the following: (1) prohibiting the copying (hereinafter to be referred to as "Never Copy"), (2) permitting the copying only once (hereinafter to be referred to as "One Copy"), and (3) permitting the copying without restriction (hereinafter to be referred to as "Copy Free"). When digital video information embedded with this kind of identification information is copied onto other DVD, a recording apparatus reads out the identification information from within the digital video information, and if this identification information shows Never Copy, the recording apparatus does not record this digital video information.

Further, there is also proposed a method of restricting the copying of a picture or a video image by embedding identification information having a function similar to the above into the display range of the image or the video image as a watermark.

Further, a method of scrambling a picture or a video image at the time of recording or reproducing this image or video image also contributes to restricting the recording or reproducing digital video information.

In order to restrict the copying of digital video information by using the above-described identification information, it is necessary to prepare a recording apparatus or a reproducing apparatus equipped with a function of recognizing the identification information based on a predetermined rule prescribing a disposition of the identification information, a decision method, etc. (hereinafter to be referred to as a compliant recording apparatus and a compliant reproducing apparatus respectively).

When other recording apparatus or reproducing apparatus not equipped with the function of recognizing the identification information (hereinafter to be referred to as a non-compliant recording apparatus and a non-compliant reproducing apparatus respectively) is used, there is a case where the identification information is disregarded and digital video information is copied although the information is Never Copy digital video information. If the compliant reproducing apparatus has allowed a reproduction of digital video information copied by the non-compliant recording apparatus, the copying of the Never Copy digital video information is implicitly permitted. In other words, a person who has copied the Never Copy digital video information by the non-compliant recording apparatus is not punished and does not feel any inconvenience at all despite the fact that he or she has copied the Never Copy digital video information. If this situation is left untouched, it is not possible to promote the distribution of the compliant recording apparatus and compliant reproducing apparatus, and has a problem that it is not possible to restrict the copying of digital video information.

Further, in the case of One Copy digital video information, this information can be recorded only once by a compliant recording apparatus. When digital video information recorded by this compliant recording apparatus is reproduced by a non-compliant reproducing apparatus, unlimited copying of the digital video information is allowed based on this non-compliant reproducing apparatus.

Further, in general, a reproducing apparatus can convert digital video information recorded on a DVD into analog information and outputs the information to the outside. Some recording apparatuses can convert analog video information such as a picture or a video image into digital information and record it in a DVD. Accordingly, in order to effectively restrict the copying of digital video information, it is not sufficient to restrict only the copying of digital video information achieved by digitally transmitting the digital video information from a reproducing apparatus to a recording apparatus, that is, the copying by digital transmission. In other words, it is also necessary to restrict the copying of digital video information achieved by converting the digital video information into analog video information by a reproducing apparatus and sending this analog video information to a recording apparatus by analog transmission, that is, the copying by analog transmission.

SUMMARY OF THE INVENTION

It is therefore an object of the invention to provide a recording/reproducing system, a recording apparatus and a reproducing apparatus which can reduce unlimited copying of recorded/reproduced information carried out by other recording apparatus or reproducing apparatus not equipped with a function of restricting the copy of recorded/reproduced information, and which can effectively restrict the copying of recorded/reproduced information.

The system in accordance with the present invention comprises a recording apparatus for recording record information onto a recording medium as digital data and a reproducing apparatus for reading the record information from the recording medium and outputting the read record information in order to reproduce the record information recorded on the recording medium.

The record information includes: image information which represents an image or a picture; a first identification information which represents any one of never copy, one copy and copy free; and a second identification information which represents any one of at least the never copy and the one copy.

The never copy indicates that copying of the information is prohibited. The one copy indicates that the copying of the information is permitted only once. The copy free indicates that the copying of the information is permitted.

The recording apparatus comprises: an input device for inputting the record information; a first recording determination device for determining whether the first identification information included in the input record information indicates the never copy, the one copy or the copy free; a second recording determination device for determining whether the second identification information included in the input record information indicates the never copy or the one copy; a recording control device for determining on the basis of determinations of the first recording determination device and the second recording determination device whether recording the input record information onto the recording medium is permitted or prohibited; a recording device for recording the input record information onto the recording medium in accordance with a determination of the recording control device; an encryption control device for determining on the basis determinations of the first recording determination device and the second recording determination device whether or not the input record information is to be encrypted; and an encryption device for encrypting the input record information in accordance with a determination of the encryption control device.

The reproducing apparatus comprises: a read device for reading the record information from the recording medium; a first reproduction determination device for determining whether the first identification information included in the read record information indicates the never copy, the one copy or the copy free; a second reproduction determination device for determining whether or not the read record information is encrypted by the recording apparatus; an output control device for determining on the basis of determinations of the first reproduction determination device and the second reproduction determination device whether outputting the read record information is permitted or prohibited; an output device for outputting the read record information in accordance with a determination of the output control device; a decryption control device for determining on the basis of a determination of the second reproduction determination device whether or not the read record information is to be decrypted; a decryption device for decrypting the read record information in accordance with a determination of the decryption control device; a changing control device for determining on the basis of determinations of the first reproduction determination device and the second reproduction determination device whether or not the second identification information is to be changed such that the second identification information indicates the never copy; and a changing device for changing the second identification information such that the second identification information indicates the never copy, in accordance with a determination of the changing control device.

As stated above, the first identification information indicates any one of the never copy, the one copy and the copy free. To realize this first identification information having three statuses, for example, three different values may be used as the first identification information. Alternatively, only two different values may be used as the first identification information. In this case, the two values indicate the first status and the second status, and the absence of the value indicates the third status.

Furthermore, the second identical information is changed by the reproducing apparatus such that the second identical information indicates the never copy, when the reproducing apparatus reproduces the record information that is indicated as one copy and that has been recorded on the recording medium once. The first identification information is not changed by not only the reproducing apparatus but also the recording apparatus.

In the recording apparatus, the input device inputs the record information to the inside of the recording apparatus. The first recording determination device determines whether the first identification information included in the record information indicates the never copy, the one copy and the copy free. The second recording determination device determines whether the second identification information indicates the never copy or the one copy. On the basis of these two determinations, it can be determined that a copy restriction status of the record information is any one of the following four statuses.

(A) never copy
(B) one copy
(C) no more copy
(D) copy free

The "no more copy" means the prohibition of copying any more as the record information that is indicated as one copy has been recorded once onto the recording medium.

The recording control device determines on the basis of the copy restriction status (A), (B), (C) or (D) whether recording the record information onto the recording medium is permitted or prohibited. The recording device records the record information onto the recording medium, only when the recording control device determines that recording the record information is permitted.

Further, the encryption control device determines on the basis of the copy restriction status (A), (B), (C) or (D) whether the record information is to be encrypted or not. The encryption device encrypts the record information, only when the encryption control device determines that the record information is to be encrypted. In this case, the encrypted record information is recorded onto the recording medium.

Depending on the copy restriction status of the record information (A), (B), (C) or (D), the recording apparatus finally controls the recording of the record information as follows:

(i) When the copy restriction status of the record information is the never copy, the recording of the record information is prohibited. Therefore, the record information is not recorded onto the recording medium.

(ii) When the copy restriction status of the record information is the one copy, the record information is encrypted, and the recording of the record information is permitted. Therefore, the encrypted record information is recorded onto the recording medium.

(iii) When the copy restriction status of the record information is the no more copy, the recording of the record information is prohibited. Therefore, the record information is not recorded onto the recording medium.

(iv) When the copy restriction status of the record information is the copy free, the recording of the record information is permitted. Therefore, the record information is recorded onto the recording medium without being encrypted.

In the reproducing apparatus, the read device reads the record information from the recording medium. The first reproduction determination device determines whether the first identification information included in the record information indicates the never copy, the one copy and the copy free. The second reproduction determination device determines whether or not the record information has been encrypted by the recording apparatus. On the basis of these determinations, it can be determined that the copy restriction status of the record information is any one of the following four statuses.

(E) never copy
(F) no more copy
(G) copy free
(H) abnormal copy

"Abnormal copy" indicates, for example, that the record information was recorded onto the recording medium by an recording apparatus except for the recording apparatus of this system, or that the record information has been altered illegally or in a dishonest manner. For example, it is assumed that there is a case where the first identification information indicates the one copy, but the record information has not been encrypted. There is no possibility that such a case occurs as long as the record information was recorded on the recording apparatus of this system.

After the copy restriction status of the record information is determined, the output control device determines on the basis of the copy restriction status of the record information whether outputting the record information in permitted or prohibited. The output device outputs the record information to an external apparatus or a communication means, only when the output control device determines that outputting the record information is permitted.

Furthermore, the decryption control device determines on the basis of the copy restriction status of the record information whether the record information is to be decrypted or not. The decryption device decrypts the record information, only when the decryption control device determines that the record information is to be decrypted.

Depending on the copy restriction status of the record information (E), (F), (G) or (H), the reproducing apparatus finally controls the outputting of the record information as follows:

(i) When the copy restriction status of the record information is the never copy, the outputting of the record information is permitted. Therefore, the record information is output from the reproducing apparatus. If a digital monitor is connected with the reproducing apparatus, a user or an audience can watch the image or picture corresponding to the record information. If the recording apparatus of this system is connected with the reproducing apparatus, the record information cannot be copied to another recording medium, because the recording apparatus prohibits the recording of this record information.

(ii) When the copy restriction status of the record information is the no more copy, the record information is decrypted, and the outputting of the record information is permitted. Therefore, the decrypted record information is output from the reproducing apparatus. If a digital monitor is connected with the reproducing apparatus, a user or an audience can watch the image or picture corresponding to the record information. If the recording apparatus of this system is connected with the reproducing apparatus, the record information cannot be copied to another recording medium, because the recording apparatus prohibits the recording of this record information.

(iii) When the copy restriction status of the record information is the copy free, the outputting of the record information is permitted. Therefore, the record information is output from the reproducing apparatus. If a digital monitor is connected with the reproducing apparatus, a user or an audience can watch the image or picture corresponding to the record information.

(iv) When the copy restriction status of the record information is the abnormal copy, the outputting of the record information is prohibited. Therefore, the record information is not output from the reproducing apparatus. As a result, a user or an audience cannot watch the image or picture corresponding to the record information.

Further, in the reproducing apparatus, the changing control device determines on the basis of the copy restriction status of the record information whether or not the second identification information included in the record information is to be changed such that the second identification information indicates the never copy (or no more copy). The changing device changes the second identification information such that the second identification information indicates the never copy (or no more copy), only when the changing control device determines that the second identification information is to be changed.

Therefore, when the copy restriction status of the record information is the no more copy, the second identification information included in the record information is changed such that the second identification information indicates the never copy (or no more copy). Accordingly, if the recording apparatus of this system is connected with the reproducing apparatus, the record information cannot be copied to another recording medium any more.

Accordingly, by the system in accordance with the present invention, the copying of the record information can be sufficiently prevented.

In the above-stated system, the digital-analog converting device and an analog output device may be added to the reproducing apparatus. The digital-analog converting device converts the record information output by the output device into an analog signal. The analog output device outputs the analog signal to an external apparatus or an external communication means. Therefore, it is possible to prevent the record information from copying by way of an analog transmission. In this case, the changing control device may determines whether or not the second identification information is to be changed, only when the record information is to be output as the analog signal. Therefore, it is possible to simplify the changing process of the second identification information.

In the above-stated system, the output device outputs the record information as a digital signal to an external apparatus or the like. Further, in the above-stated system, an external apparatus determination device may be added to the reproducing apparatus. The external apparatus determination device determines whether or not the external apparatus is authorized. In this case, the output control device determines that outputting the read record information is prohibited, when the first reproduction determination device determines that the first identification information indicates never copy and the external apparatus determination device determines that the external apparatus is not authorized. And, the output control device determines that outputting the read record information is prohibited, when the first reproduction determination device determines that the first identification information indicates one copy and the external apparatus determination device determines that the external apparatus is not authorized.

If such an external apparatus determination device is added to the reproducing apparatus, the reproducing apparatus finally controls the digital output of the record information as follows, depending on the aforementioned copy restriction status of the record information (E), (F), (G) or (H), and a determination of the external apparatus detemination device:

(i) When the copy restriction status of the record information is the never copy, and the external apparatus is not authorized, the digital output of the record information is prohibited.

(ii) When the copy restriction status of the record information is the no more copy, and the external apparatus is not authorized, the digital output of the recording information is prohibited.

(iii) When the copy restriction status of the record information is the copy free, the digital output of the record information is permitted. In this case, the determination of whether the external apparatus is authorized may be disregarded.

(iv) When the copy restriction status of the record information is the abnormal copy, the digital output of the record information is prohibited regardless of whether the external apparatus is authorized or not.

Thus, if the external apparatus determination device is added to the reproducing apparatus, if a digital monitor is assigned to an authorized apparatus, and if a recording apparatus except for the recording apparatus of this system (i.e., a non-compliant recording apparatus) is not assigned to the authorized apparatus, a user or an audience can watch the image or the picture corresponding to the record information with the digital monitor, but cannot copy the record information to the another recording medium with the non-compliant recording apparatus. Accordingly, it is possible to prevent the record information from copying by way of a digital transmission.

In the above-stated system, the record information may further includes a third identification information which represents any one of the never copy, the one copy and the copy free. In this case, a third recording determination device is added to the recording apparatus. The third recording determination device determines whether the third identification information included in the input record information indicates the never copy, the one copy or the copy free. Furthermore, in this case, the recording control device determines on the basis of determinations of the first recording determination device, the second recording determination device and the third recording determination device whether recording the input record information onto the recording medium is permitted or prohibited. By adding such devices, the copying of the record information can be more sufficiently prevented.

In addition to this, a third reproduction determination device may added to the reproducing apparatus. The third reproduction determination device determines whether the third identification information included in the read record information indicates the never copy, the one copy or the copy free. In this case, the output control device determines on the basis of determinations of the first reproduction determination device, the second reproduction determination device and the third reproduction determination device whether outputting the read record information is permitted or prohibited. Therefore, the copying of the record information can be more sufficiently prevented.

Furthermore, a receiving apparatus may be added to the above-stated system. The receiving apparatus is an apparatus for receiving the record information transmitted from an information generation source and outputting the received record information to the recording apparatus.

The receiving apparatus comprises: an information output device for outputting the received record information to the recording apparatus as a digital signal; an information determination device for determining whether the first identification information included in the received record information indicates the never copy, the one copy or the copy free; a recording apparatus determination device for determining whether or not the recording apparatus is authorized; an information output control device for determining on the basis of determinations of the information determination device and the recording apparatus determination device whether outputting the received record information is permitted or prohibited.

The receiving apparatus can output the received record information to the recording apparatus as a digital signal. To restrict the copying of the record information, the information output control device determines that outputting the received record information is permitted, when the information determination device determines that the first identification information indicates one copy and the recording apparatus determination device determines that the recording apparatus is authorized. Only when the information output control device determines that outputting the received record information is permitted, the received recording information is supplied to the recording apparatus. This means that it can be prevented the copying of the record information at the entrance of the system.

Furthermore, the above-stated object can be also achieved by another types of system in accordance with another aspect of the present invention. This system comprises a recording apparatus for recording record information onto a recording medium as digital data and a reproducing apparatus for reading the record information from the recording medium and outputting the read record information to reproduce the record information recorded on the recording medium. The record information includes: image information which represents an image or a picture; a first identification information which represents any one of the never copy, the one copy and the copy free; and a second identification information which represents any one of at least the never copy and the one copy.

The recording apparatus comprises: an input device for inputting the record information; a first recording determination device for determining whether the first identification information included in the input record information indicates the never copy, the one copy or the copy free; a second recording determination device for determining whether the second identification information included in the input record information indicates the never copy or the one copy; a recording control device for determining on the basis of determinations of the first recording determination device and the second recording determination device whether recording the input record information onto the recording medium is permitted or prohibited; a recording device for recording the input record information onto the recording medium in accordance with a determination of the recording control device; an encryption control device for determining on the basis determinations of the first recording determination device and the second recording determination device whether or not the input record information is to be encrypted; an encryption device for encrypting the input record information in accordance with a determination of the encryption control device; and a certification information adding device for adding a certification information to the input record information, the certification information indicating that the input record information is recorded by the recording apparatus.

This recording apparatus has the same devices as the above-stated recording apparatus except for the certification information adding device.

The reproducing apparatus comprises: a read device for reading the record information from the recording medium; a first reproduction determination device for determining whether the first identification information included in the read record information indicates the never copy, the one copy or the copy free; a second reproduction determination device for determining whether or not the certification information is included in the read record information; an output control device for determining on the basis of determinations of the first reproduction determination device and the second reproduction determination device whether outputting the read record information is permitted or prohibited; an output device for outputting the read record information in accordance with a determination of the output control device; a decryption control device for determining on the basis of a determination of the second reproduction determination device whether or not the read record information is to be decrypted; a decryption device for decrypting the read record information in accordance with a determination of the decryption control device; a changing control device for determining on the basis of determinations of the first reproduction determination device and the second reproduction determination device whether or not the second identification information is to be changed such that the second identification information indicates the never copy; and a changing device for changing the second identification information such that the second identification information indicates the never copy, in accordance with a determination of the changing control device.

This reproducing apparatus has the same devices as the above-stated reproducing apparatus except for the second reproduction determination device.

In this system, the certification information is added to the record information, when the recording of the record information is carried out by the recording apparatus. In the reproducing apparatus, the second reproduction determination device determines whether or not the certification information is included in the record information, when the record information is reproduced. Then, the output control device determines on the basis of the first identification information and the certification information whether outputting the read record information is permitted or prohibited. Further, the decryption control device determines on the basis of the certification information whether or not the read record information is to be decrypted. Furthermore, the changing control device determines on the basis of the first identification information and the certification code whether or not the second identification information is to be changed.

According to such a system, the copying of the record information can be sufficiently prevented.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a view for showing a relationship between a determination and digital output control by the satellite broadcasting receiver in the embodiment of the present invention;

FIG. 6 is a block diagram for showing a recording apparatus according to the embodiment of the present invention;

FIG. 7 is a flowchart for showing a record restriction control in the embodiment of the present invention;

FIG. 8 is a view for showing a relationship between the statuses of a watermark, a copy protection code and a CGMS and controls executed to these statuses by a controller;

FIGS. 11A and 11B are views for showing a relationship between the statuses of a watermark, CGMS, etc. and controls executed to these statuses by a controller.

DETAILED DESCRIPTION OF THE PREFERRED EMBODIMENTS

An embodiment of the present invention will be described below with reference to FIGS. 1 through 12. In the description set forth hereinafter, the present invention is applied to a recording/reproducing system capable of recording, reproducing and copying both of digital video information transmitted from a digital satellite broadcasting system and digital video information previously recorded on a DVD.

I. Recording System

Figure 1:
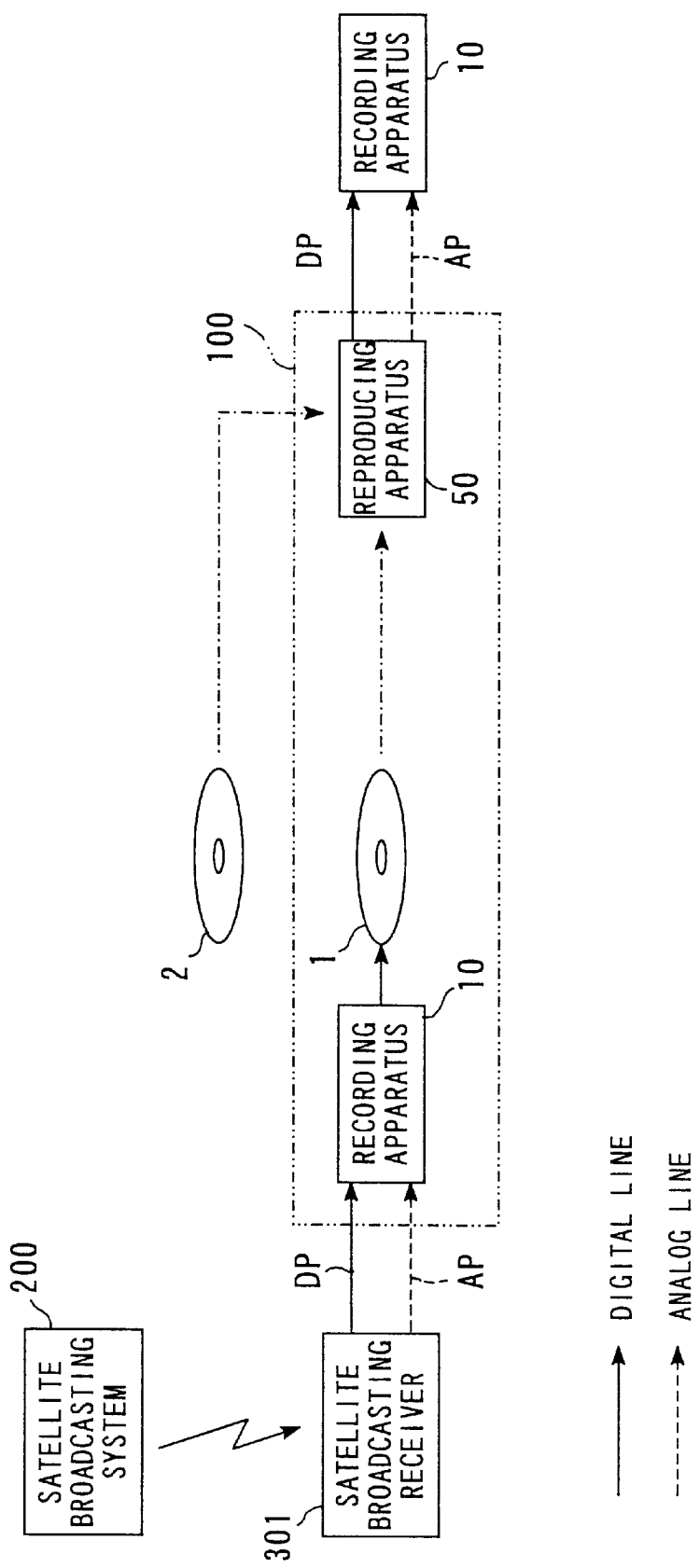
FIG. 1 is a block diagram for showing a recording/reproducing system according to an embodiment of the present invention.

FIG. 1 shows a digital satellite broadcasting system as an information generation source and a recording/reproducing system and others according to an embodiment of the present invention.

As shown in FIG. 1, a recording/reproducing system 100 includes a recording apparatus 10, a reproducing apparatus 50 and a satellite broadcasting receiver 301.

The recording apparatus 10 is an apparatus for recording digital video information DP or analog video information AP input from the outside, onto a DVD 1 which is a recordable or rewritable recording medium (or a recordable DVD). The recording apparatus 10 is equipped with a digital input terminal for inputting the digital video information DP and an analog input terminal for inputting the analog video information AP, and records the digital video information DP input from the digital input terminal onto the DVD 1 as a digital data and converts the analog video information AP input from the analog input terminal into digital video information DP and records this data onto the DVD 1.

The reproducing apparatus 50 is an apparatus for reading out the digital video information DP recorded on the DVD 1 by the recording apparatus 10, and outputting this digital video information DP as it is or outputting this information as analog video information AP after converting this digital video information DP into the analog video information. The reproducing apparatus 50 is equipped with a digital output terminal for outputting the digital video information DP and an analog output terminal for outputting the analog video information AP. When an analog monitoring apparatus such as a CRT (Cathode Ray Tube) or a PDP (Plasma Display Panel) or the like (not shown) is connected to the analog output terminal of the reproducing apparatus 50, for example, it is possible to reproduce a picture or a video image recorded as the digital video information DP on the DVD 1. When the digital output terminal of the reproducing apparatus 50 is connected to the digital input terminal of the recording apparatus 10, as shown in FIG. 1, the digital video information DP recorded on the DVD 1 can be output as digital data to the recording apparatus 10 from the reproducing apparatus 50. In this case, it is possible to record the digital video information DP onto other DVD by the recording apparatus 10. As stated above, when the digital output terminal of the reproducing apparatus 50 is connected to the digital input terminal of the recording apparatus 10, the digital video information DP can be copied by digital transmission. As shown in FIG. 1, when the analog output terminal of the reproducing apparatus 50 is connected to the analog input terminal of the recording apparatus 10, the digital video information DP can be copied by analog transmission.

In FIG. 1, a satellite broadcasting system 200 is a system provided in a broadcasting station, for example, for carrying out a digital satellite broadcasting of a moving picture, a concert, a television program or the like. A satellite broadcasting receiver 301 is an apparatus for receiving a digital satellite broadcasting sent by the satellite broadcasting system 200, and is structured by an IRD (Integrated Receiver Decoder) or an STB (Set Top Box). The satellite broadcasting receiver 301 receives a wave transmitted from the broadcasting station and outputs the digital video information DP included in the received wave. Further, the satellite broadcasting receiver 301 can also convert the digital video information DP included in the received wave into the analog video information AP and outputs this analog video information.

The digital video information DP is compressed by MPEG2 (Moving Picture Expert Group Phase 2) for example, and includes digital data including digital video data, various headers and added information for example. The digital video data is digitized data of a picture or a video image structuring a moving picture, a concert, a television program or the like. A data format of the digital video information DP is different between a case where the digital video information DP is being recorded onto the DVD 1 and a case where the digital video information DP is being transmitted between the apparatuses. The analog video information AP is an analog video signal corresponding to the digital video information DP.

The digital video information DP and the analog video information AP are respectively applied with one of the copy protections of Never Copy, One Copy (or One Generation Copy) and Copy Free. Never Copy means the entire prohibiting of the recording of the digital video information DP or the analog video information AP onto a recording medium. One Copy means the permission of recording the digital video information DP or the analog video information AP onto a recording medium only once. In other words, by One Copy, making what is called a first-generation copy is permitted, but making copy of a second-generation and after is prohibited. Copy Free means no restriction of the copying of the digital video information DP or the analog video information AP onto a recording medium. By Copy Free, it is possible to make copy of the second generation and after, not to mention the first-generation copy.

In the case of carrying out a digital satellite broadcasting of a moving picture by the satellite broadcasting system 200 as shown in FIG. 1, for example, the digital video information DP transmitted from the satellite broadcasting system 200 and received by the satellite broadcasting receiver 301 is usually permitted to be recorded only once. In this case, the digital video information DP is One Copy. Further, when the digital video information DP such as a moving picture or the like is recorded in advance onto a read-only DVD 2 as shown in FIG. 1 and the DVD 2 is sold in the market, the reproduction of the digital video information DP recorded on the DVD 2 is usually prohibited. In this case, the digital video information DP is Never Copy. Further, when the DVD 2 recorded with the digital video information DP is distributed free of charge, the copying of the digital video information DP is not restricted in many cases. In this case, the digital video information DP is Copy Free.

The digital video information DP and the analog video information AP are embedded with a watermark, a copy protection code and a code based on CGMS (Copy Generation Management System) (hereinafter to be referred to as a "CGMS"). These are identification information for making the recording apparatus 10 and the reproducing apparatus 50 recognize the copy protection applied to the digital video information DP and the analog video information AP. The recording apparatus 10 and the reproducing apparatus 50 are based on a predetermined rule on the copy protection that prescribes a disposition, a decision method, a scrambling method, etc. of the watermark, the copy protection code and the CGMS, respectively. As described later, the recording apparatus 10 and the reproducing apparatus 50 can control the recording and reproduction of the digital video information DP and the analog video information AP based on the watermark, the copy protection code and the CGMS.

The watermark, the copy protection code and the CGMS will be explained next. The watermark is embedded within a picture or a video image without degradation of the quality of the picture or the video image itself. The watermark represents one of Never Copy, One Copy and Copy Free. In the present embodiment, it is assumed that when there exists no watermark within a picture or a video image, this represents Copy Free. The watermark is not changed by the recording apparatus 10 or the reproducing apparatus 50.

The copy protection code is embedded within a picture or a video image, and is disposed near the periphery of the display range of the picture or the video image. The copy protection code represents one of One Copy and No More Copy. "No More Copy" means the prohibition of copying any more as the One Copy digital video information DP or the One Copy analog video information AP has been recorded once onto the DVD 1 or the like. In this case, when the One Copy digital video information DP or the One Copy analog video information AP is once recorded onto the DVD 1 by the recording apparatus 10 and then the digital video information DP recorded on the DVD 1 is read out by the reproducing apparatus 50 and is converted into the analog video information AP and a result is output to the outside, the copy protection code of One Copy is changed to No More Copy by the reproducing apparatus 50.

The copy protection code represents One Copy and No More Copy respectively in two different statuses. It may be so arranged that when the copy protection code exists in the digital video information DP or the analog video information AP, the copy protection code represents One Copy, and when the copy protection code does not exist in the digital video information DP or the analog video information AP, this represents No More Copy. In this case, when the One Copy digital video information DP or the One Copy analog video information AP is once recorded onto the DVD 1 by the recording apparatus 10 and then the digital video information DP recorded on the DVD 1 is read out by the reproducing apparatus 50 and is converted into the analog video information AP and a result is output to the outside, the copy protection code is deleted by the reproducing apparatus 50.

Figure 2:
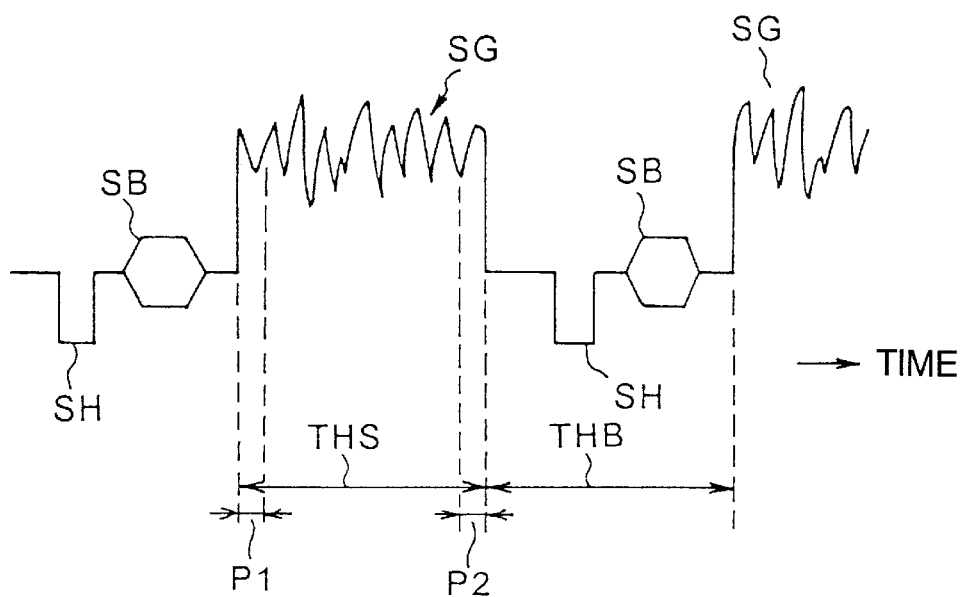
FIG. 2 is a waveform diagram for showing a video signal corresponding to analog video information in the embodiment of the present invention.
Figure 3:
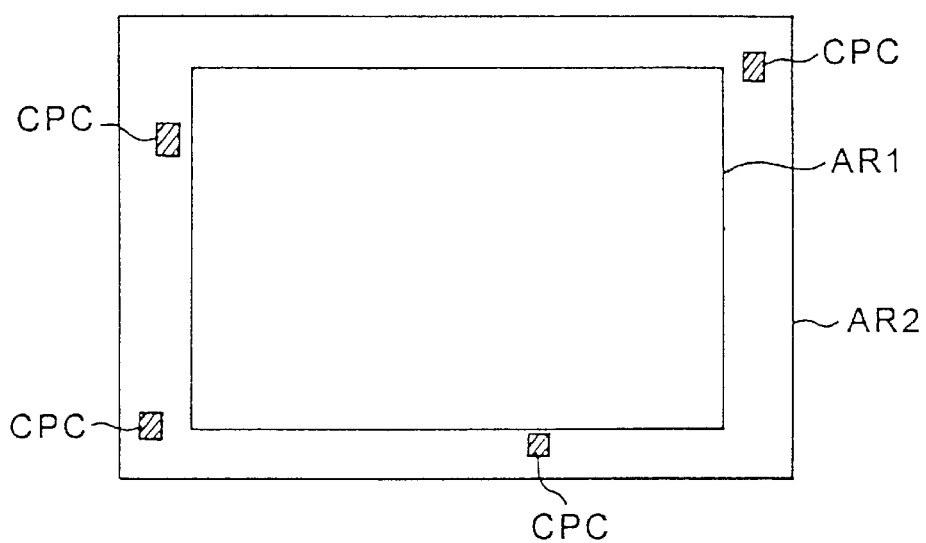
FIG. 3 is an explanatory view for showing a display range which an audience can actually watch, a range for forming a picture or a video image and a position where a copy protection code is embedded, in the embodiment of the present invention.

Referring to FIGS. 2 and 3, a copy protection code embedded position will be explained by taking an example of the case where the analog video information AP is a video signal based on the NTSC (National Television System Committee) system. As shown in FIG. 2, the video signal of the NTSC system includes a horizontal synchronizing signal SH, a burst signal SB, a solid image signal SG for forming a picture or a video image, etc. A period corresponding to the solid image signal SG is a horizontal scanning period THS, and a period between the solid image signal SG and a next solid image signal SG is a horizontal blanking period THB.

A picture or a video image displayed on the CRT or the PDP is formed by the solid image signal SG within the horizontal scanning period THS. However, as shown in FIG. 3, in general, on the CRT or the PDP, a display range AR1 which can be actually watched by an audience exists in many cases inside an image forming range AR2 in which the picture or the video image is formed by the solid image signal SG. As a result, the vicinity of the peripheral portion of the display range AR1 outside the display range AR1 is a portion that cannot be actually watched by the audience. Depending on the type of the CRT and PDP, there are CRT's and PDP's in which the display range AR1 and the forming range AR2 almost coincide. Even in this case, the peripheral portion of the picture or the video image is not easily watched by the audience, and this is a portion that gives little effect to the picture or the video image.

Accordingly, as shown in FIG. 3, the copy protection code CPC is embedded in the vicinity of the peripheral portion of the display range AR1 outside the display range AR1 of the picture or the video image, although this embedded position is inside the image forming range AR2 of the picture or the video image. The vicinity of the peripheral portion of the display range AR1 outside the display range AR1 of the picture or the video image is formed by the solid image signal SG positioned at a starting portion P1 and an ending portion P2 of the horizontal scanning period THS. Accordingly, copy protection code CPC is embedded into the solid image signal SG positioned at the starting portion P1 and the ending portion P2 of the horizontal scanning period THS as shown in FIG. 2. Similarly, the copy protection code CPC is also embedded into the solid image signal positioned at a starting portion and an ending portion of a vertical scanning period.

CGMS is the identification information for carrying out the copy protection based on the Copy Generation Management System, and this represents one of Never Copy, One Copy and Copy Free, like the watermark. CGMS has two kinds of forms; CGMS-D for being added to the digital video information DP and the CGMS-A for being added to the analog video information AP. When the data format of the digital video information DP is a data format for recording onto a DVD, CGMS-D is written into the header area of each sector structuring the digital video information DP. CGMS-A is embedded into each scanning starting portion of line 20 and line 283, for example, of the horizontal scanning line of a video signal (analog video information AP). Further, CGMS is changed from One Copy to Never Copy by the recording apparatus 10 when One Copy digital video information DP or One Copy analog video information AP is recorded onto the DVD 1 by the recording apparatus 10.

In the present embodiment, when the digital video information DP or the analog video information AP is Never Copy, a watermark representing Never Copy and a CGMS representing Never Copy are embedded. When the digital video information DP or the analog video information AP is One Copy, a watermark representing One Copy, a copy protection code representing One Copy and a CGMS representing One Copy are embedded. Further, when the digital video information DP or the analog video information AP is Copy Free, at least CGMS for representing Copy Free is embedded.

II. Satellite Broadcasting Receiver

The satellite broadcasting receiver 301 will be explained next. The satellite broadcasting receiver 301 can digitally output the digital video information DP included in the wave received from the satellite broadcasting system 200, or can output the digital video information DP after converting it into the analog video information AP. Accordingly, the satellite broadcasting receiver 301 is equipped with an analog output terminal for outputting the analog video information AP and a digital output terminal for outputting the digital video information DP.

Further, the satellite broadcasting receiver 301 has a function of deciding whether or not the digital video information DP is to be output from the digital output terminal, based on the watermark included in the received digital video information DP and the type of an external apparatus connected to the digital output terminal.

Figure 4:
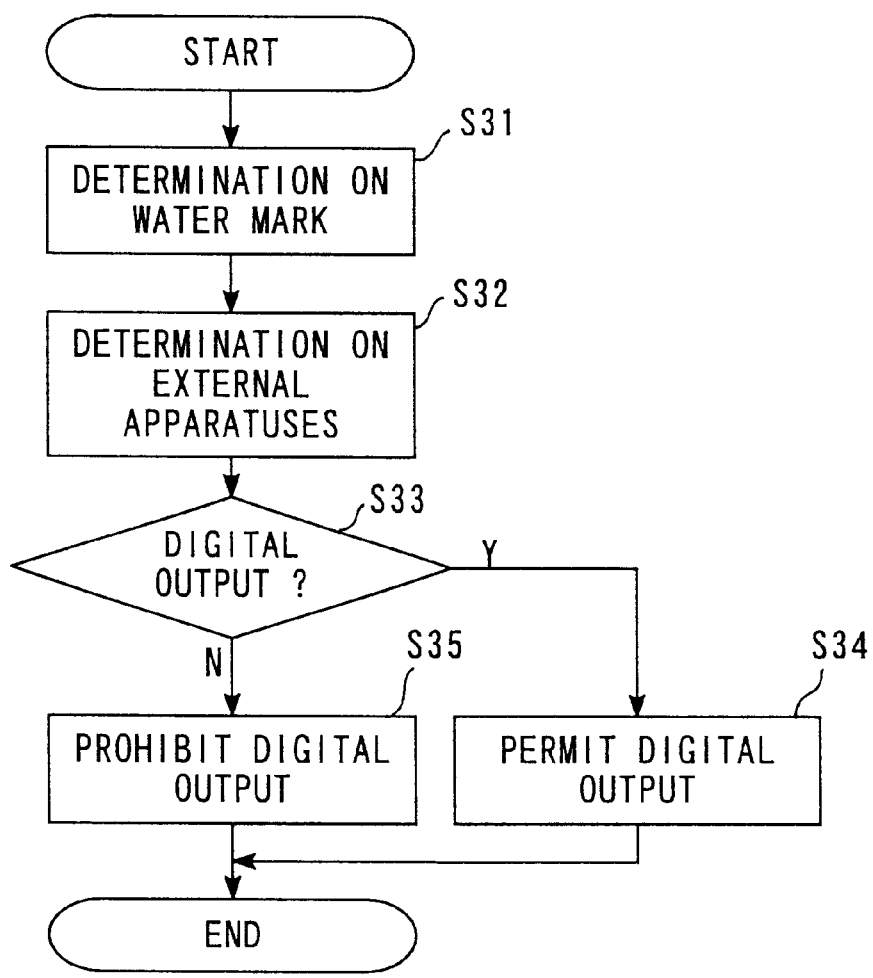
FIG. 4 is a flowchart for showing digital output control of a satellite broadcasting receiver in the embodiment of the present invention.

Referring to FIG. 4, this function will be explained. When the satellite broadcasting receiver 301 has received the digital video information DP, the satellite broadcasting receiver 301 at first detects a watermark embedded within this digital video information DP, and determines whether this watermark represents Never Copy, One Copy or Copy Free (step 31). Next, the satellite broadcasting receiver 301 determines whether or not the types of the external apparatuses connected to the digital output terminal of the satellite broadcasting receiver 301 coincide with the types of authorized apparatuses registered in advance in the satellite broadcasting receiver 301 (step 32). In this case, the recording apparatus 10 of the recording/reproducing system 100 and authorized apparatuses not equipped with the function of recording the digital video information DP onto the recording medium, such as, for example, a digital monitoring apparatus and the like are registered in advance in the satellite broadcasting receiver 301. Then, the satellite broadcasting receiver 301 determines whether the received digital video information DP is to be digitally output or not, based on the status of the watermark and the determination of whether or not the external apparatuses are the authorized apparatuses (step 33).

FIG. 5 is a control management table for showing a relationship between each determination and control of the satellite broadcasting receiver 301. This control management table is recorded in advance in the satellite broadcasting receiver 301, and the satellite broadcasting receiver 301 makes a determination in the above step 33 by using the control management table.

As shown in the first row of the control management table in FIG. 5, when the watermark represents Never Copy and the external apparatus connected to the digital output terminal coincide with any one of registered the apparatuses, namely, any one of the authorized apparatuses, the satellite broadcasting receiver 301 outputs the digital video information DP from the digital output terminal (step 34). On the other hand, as shown in the second row, when the external apparatus connected to the digital output terminal do not coincide with any one of the authorized apparatuses, the satellite broadcasting receiver 301 does not output the digital video information DP from the digital output terminal (step 35). With this arrangement, it is possible to prevent the Never Copy digital video information DP from being output to the apparatuses equipped with the recording function other than the monitoring apparatus, for example. Thus, it is possible to restrict the copying by digital transmission of the digital video information DP.

As shown in the third row of the control management table in FIG. 5, when the watermark represents One Copy and the external apparatuses connected to the digital output terminal coincide with any one of the authorized apparatuses, the satellite broadcasting receiver 301 outputs the digital video information DP from the digital output terminal (step 34). On the other hand, as shown in the fourth row of the control management, when the external apparatuses connected to the digital output terminal do not coincide with any one of the authorized apparatuses, the satellite broadcasting receiver 301 does not output the digital video information DP from the digital output terminal (step 35). With this arrangement, it is possible to prevent the One Copy digital video information DP from being output to recording apparatuses other than the recording apparatus 10, for example. Thus, it is possible to restrict the copying by digital transmission of the digital video information DP.

Further, as shown in the fifth row of the control management table, when the watermark represents Copy Free, the satellite broadcasting receiver 301 outputs the digital video information DP from the digital output terminal (step 34).

III. Recording Apparatus

Referring next to FIG. 6, the recording apparatus 10 of the recording/reproducing system 100 will be explained.

As shown in FIG. 6, the recording apparatus 10 is equipped with a digital input terminal 11, an analog input terminal 12, an analog-digital (A/D) converter 13, an MPEG encoder 14, a switch 15, a CGMS-D detector 16, a CGMS-A detector 17, a watermark detector 18, a copy protection code detector 19, a controller 20, a format converter 21, a scramble processor 22, a switch 23, an error correction code adding device 24, a certification code adding device 25 and a recording device 26.

When the analog output terminal of the satellite broadcasting receiver 301 or the analog output terminal of the reproducing apparatus 50 is connected to the analog input terminal 12 of the recording apparatus 10, for example, the analog video information AP output from the satellite broadcasting receiver 301 or the reproducing apparatus 50 is input to the recording apparatus 10 from the analog input terminal 12. Then, this analog video information AP is input to the analog-digital converter 13 and the CGMS-A detector 17 respectively. The analog-digital converter 13 converts the analog video information AP into digital video information DP, and outputs it to the MPEG encoder 14 and the copy protection code detector 19 respectively. The MPEG encoder 14 encodes the video information DP output from the analog-digital converter 13 by using a coding system based on MPEG2. As explained above, the analog video information AP is converted into the digital video information DP by the analog-digital converter 13 and the MPEG encoder 14, and a result is input to the switch 15.

The digital video information DP input to the switch 15 from the MPEG encoder 14 is output to the watermark detector 18 and the format converter 21 through the switch 15. The switch 15 is a switch for changing over between an input from the analog input terminal 12 and an input from the digital input terminal 11. The switch control of the switch 15 is carried out based on a switch control signal SCS1 output from the controller 20.

The watermark detector 18 detects the watermark from the digital video information DP input through the switch 15, and outputs watermark information CPI1 corresponding to this watermark to the copy protection code detector 19 and the controller 20 respectively. The copy protection code detector 19 detects a copy protection code from the video information output from the analog-digital converter 13, and outputs copy protection information CPI2 corresponding to this copy protection code to the controller 20. The copy protection code detector 19 may use the watermark information CPI1 output from the watermark detector 18, at the time of detecting the copy protection code from the digital video information DP. The CGMS-A detector 17 detects CGMS-A from the analog video information AP input from the analog input terminal 11, and outputs CGMS information CPI4 corresponding to this CGMS-A to the controller 20.

The format converter 21 converts the data format of the digital video information DP input through the switch 15 into a data format for recording onto a DVD. More specifically, in the format converter 21, the digital video information DP is divided into a plurality of sectors. Each sector consists of a header area positioned at the header portion of the sector, a data area positioned at the intermediate portion, and an error detection code area positioned at the end portion of the sector. Address management information, data control information, etc. necessary for the recording and reproduction onto and from the DVD are written in the header area. Digital video data corresponding to a picture or a video information is written in the data area. An error detection code for detecting an error of each sector or each group consisting of a plurality of sectors is written in an error detection code area. Further, the format converter 21 obtains CGMS information from the controller 20, generates CGMS-D corresponding to this CGMS information and adds this CGMS-D to the header area of each sector structuring the digital video information DP. When it is necessary to combine sound information with the digital video information, the format converter 21 obtains the sound information from a sound processing circuit not shown, combines this sound information with the digital video information, and writes the combined data in the data area of each sector.

The digital video information DP added with the CGMS-D is input to the scramble processor 22 and the switch 23 respectively from the format converter 21. The scramble processor 22 scrambles the digital video data recorded in the data area of each sector structuring the digital video information DP. As a result, the digital video information DP becomes data that cannot be reproduced unless the scramble is removed.

The switch 23 is a switch for changing over between the digital video information DP output from the format converter 21 through the scramble processor 22 and the digital video information DP directly output from the format converter 21. The switch control of the switch 23 is carried out based on a switch control signal SCS2 output from the controller 20. With this arrangement, it is possible to change over between the scrambled digital video information DP and the non-scrambled digital video information DP according to the control of the controller 20.

The digital video information DP output through the switch 23 is added with an error correction code by the error correction code adding device 24, and a result is input to the certification code adding device 25. The certification code adding device 25 adds a certification code to the digital video information DP added with the error correction code.

The certification code is the information for certifying that the digital video information DP has been recorded onto the DVD 1 by the recording apparatus 10. The certification code is detected by the reproducing apparatus 50 at the time of reproducing the digital video information DP by the reproducing apparatus 50. Scramble removal information for removing the scramble may also be included in the certified code. The certification code is a very small data added as an intentional error to the digital video information DP added with an error correction code. Accordingly, the certification code disappears based on an error correction by the reproducing apparatus 50 after the certification code has been detected by the reproducing apparatus 50.

The digital video information DP added with a certification code by the certification code adding device 25 is input to the recording device 26. When the controller 20 has permitted the recording, the recording device 26 records the digital video information DP onto the recordable DVD 1. On the other hand, when the controller 20 has prohibited the recording, the recording device 26 does not record the digital video information DP onto the DVD 1. The operation of the recording device 26 is controlled by a record control signal WCS output from the controller 20.

On the other hand, when the digital output terminal of the satellite broadcasting receiver 301 or the digital output terminal of the reproducing apparatus 50 is connected to the digital input terminal 11 of the recording apparatus 10, the digital video information DP output from the satellite broadcasting receiver 301 or the reproducing apparatus 50 is input to the recording apparatus 10 from the digital input terminal 11. As explained above, when it has been confirmed that the external apparatus connected to the digital output terminal of the satellite broadcasting receiver 301 is the recording apparatus 10 of the recording/reproducing system 100, the satellite broadcasting receiver 301 outputs the One Copy digital video information DP. As described later, the reproducing apparatus 50 outputs only the Copy Free digital video information DP when the external apparatus connected to the digital output terminal is other than the authorized apparatus (for example, other than the monitoring apparatus). However, when the non-compliant reproducing apparatus or others are connected to the digital input terminal 11 of the recording apparatus 10, it is not possible to predict what kind of status of digital video information DP is to be input.

When the digital video information DP is input to the recording apparatus 10 from the digital input terminal 11, this digital video information DP is input to the switch 15 and the CGMS-D detector 16 respectively. The digital video information DP input to the switch 15 is input to the watermark detector 18 and the format converter 21 respectively through the switch 15.

In this case, as described above, the watermark detector 18 detects a watermark from the digital video information DP, and outputs the watermark information CPI1 corresponding to this watermark to the controller 20. The CGMS-D detector 16 detects CGMS-D from the digital video information DP input through the digital input terminal 11, and outputs CGMS information CPI3 corresponding to this CGMS-D to the controller 20.

The digital information DP input to the format converter 21 is supplied to the recording device 26 through the scramble processor 23, the error correction code adding device 24 and the certification code adding device 25, as explained above, and this digital information DP is recorded onto the DVD 1 by the recording device 26 when the recording has been permitted by the controller 20.

Further, the controller 20 is equipped with a CPU, memories, etc. and carries out an overall control of the recording apparatus 10, switch controls of the switches 15, 23 and a record restriction control as shown in FIG. 7.

Referring to FIG. 8, a record restriction control carried out by the controller 20 when the analog video information AP has been input to the recording apparatus 10 will be explained.

When the analog video information AP has been input to the recording apparatus 10, the controller 20 changes over the switch 15 to permit the input of the analog video information AP. The analog video information AP input to the recording apparatus 10 is converted into digital information by the analog-digital converter 13 and is input to the copy protection code detector 19, as described above, and at the same time, this analog video information AP is converted into the digital video information DP by the analog-digital converter 13 and the MPEG encoder 14, and is input to the watermark detector 18 and the format converter 21 through the switch 15. In this case, the controller 20 executes the record restriction control shown in FIG. 7. For the sake of convenience of explanation, the analog video information AP and the digital video information DP obtained by conversion based on this analog video information AP will hereinafter be collectively referred to as "video information".

In FIG. 7, the controller 20 determines whether the watermark included in the video information input to the recording apparatus 10 represents Never Copy, One Copy or Copy Free, based on the watermark information CPI1 output from the watermark detector 18 (step 1). Further, the controller 20 determines whether the copy protection code included in the video information input to the recording apparatus 10 represents No More Copy or One Copy, based on the copy protection information CPI2 output from the copy protection code detector 19 (step 2). Further, the controller 20 determines whether the CGMS included in the video information input to the recording apparatus 10 represents Never Copy, One Copy or Copy Free, based on the CGMS information CPI4 output from the CGMS-A detector 17 (step 3).

Next, the controller 20 determines whether the recording onto the DVD 1 of the video information input to the recording apparatus 10 is to be permitted or prohibited, based on results of the determinations in steps 1 to 3 (step 4).

When the determination has been made that the recording of he video information onto the DVD 1 is permitted (step 4=YES), the controller 20 outputs to the recording device 26 a record control signal WCS for showing the permission of the recording (step 5). Further, the controller 20 determines whether it is necessary or not to scramble the video information (more precisely, the digital video data written in the data area of each sector structuring the digital video information DP), based on the determinations in steps 1 to 3 (step 7). When the determination has been made that it is necessary to scramble the video information (step 7=YES), the controller 20 outputs the switch control signal SCS2 to the switch 23, and changes over the switch 23 so that video information scrambled by the scramble processor 22 is output to the recording device 26 (step 8). Thus, the scrambled video information is recorded onto the DVD 1 by the recording device 26.

On the other hand, when the determination has been made that it is not necessary to scramble the video information (step 7=NO), the controller 20 outputs the switch control signal SCS2 to the switch 23, and changes over the switch 23 so that non-scrambled video information is output to the recording device 26 (step 9). Thus, the non-scrambled video information is recorded onto the DVD 1 by the recording device 26.

When the determination has been made in step 4 that the recording onto the DVD 1 of the video information input to the recording apparatus 10 is prohibited (step 4=NO), the controller 20 outputs to the recording device 26 the record restriction signal WCS for showing the prohibition of the recording (step 6). Thus, this video information is not recorded onto the DVD 1.

Referring next to FIG. 8, the statuses of the watermark, the copy protection code and the CGMS included in the video information (analog video information AP) input to the recording apparatus 10 and the controls executed to these statuses by the controller 20 will be explained.

FIG. 8 is a control management table for showing a relationship between the statuses of the watermark, the copy protection code and the CGMS and the controls executed to these statuses by the controller 20. This control management table is recorded in advance in the memory of the controller 20, and the controller 20 carries out the record restriction control by using the control management table.

As shown in the first row of the control management table, when the watermark represents Never Copy, the controller 20 recognizes that the video information input to the recording apparatus 10 is Never Copy. In this case, the controller 20 outputs to the recording device 26 the record control signal WCS for prohibiting the recording. As a result, the Never Copy video information is not recorded onto the DVD 1. Thus, it is possible to prevent the Never Copy video information from being copied.

Further, as shown in the second row of the control management table, when the watermark represents One Copy and the copy protection code represents No More Copy, the controller 20 recognizes that the video information input to the recording apparatus 10 is No More Copy. In this case, the controller 20 outputs to the recording device 26 the record control signal WCS for showing the prohibition of the recording. Thus, the No More Copy video information is not recorded onto the DVD 1. Therefore, according to the recording apparatus 10 of the present embodiment, it is possible to prevent the No More Copy video information from being copied.

The recording of the video information of a moving picture or the like transmitted from the satellite broadcasting system 200 as shown in FIG. 1, for example, is permitted only once. For this purpose, the video information of a picture or the like transmitted from the satellite broadcasting system is embedded with the watermark for representing One Copy, the copy protection code for representing One Copy and the CGMS for representing One Copy respectively. When this video information is recorded onto the DVD 1 by the recording apparatus 10, the recording apparatus 10 changes the CGMS included in the video information from One Copy to Never Copy. Further, when the reproducing apparatus 50 reproduces the video information recorded on this DVD 1, the copy protection information included in this video information is changed from One Copy to No More Copy. Accordingly, at the stage where the video information has been reproduced by the reproducing apparatus 50, the video information includes the watermark for representing One Copy, the copy protection code for representing No More Copy and the CGMS for representing Never Copy. Therefore, the controller 20 recognizes that when at least the watermark represents One Copy and the copy protection code represents No More Copy, this video information is No More Copy, and thus prohibits the recording of this video information onto the DVD 1 as described above.

Further, as shown in the fourth row of the control management table, when the watermark, the copy protection code and the CGMS all represent One Copy, the controller 20 recognizes that the video information input to the recording apparatus 10 is One Copy. In this case, the controller 20 outputs to the recording device 26 the record control signal WCS for showing the permission of the copying, and at the same time, changes over the switch 23 so that video information scrambled by the scramble processor 22 is output to the recording device 26. Thus, the One Copy video information is recorded onto the DVD 1 in a scrambled state. Accordingly, the audience cannot actually reproduce the video information recorded on the DVD 1 even if he or she attempts to reproduce the video information by non-compliant reproducing apparatus other than the reproducing apparatus 50. This is because none of the non-compliant reproducing apparatus except the reproducing apparatus 50 can remove the scramble. As a result, it is possible to prevent the One Copy video information from being copied further by a non-compliant reproducing apparatus after this video information has bee n recorded onto the DVD 1. In this case, the non-compliant reproducing apparatus refers to other reproducing apparatus which is not based on a predetermined rule on the copy protection that prescribes the watermark included in the digital video information DP or analog video information AP, the copy protection code and the CMSG together with their respective dispositions, the decision method, the scramble processing method and the scramble removing method, and the like. The reproducing apparatus 50 is a compliant reproducing apparatus.

Further, as shown in the eighth row of the control management table, when the watermark and the CGMS represent Copy Free respectively, the controller 20 recognizes that the video information input to the recording apparatus 10 is Copy Free. In this case, the controller 20 outputs to the recording device 26 the record control signal WCS for showing the permission of the recording, and at the same time, changes over the switch 23 so that non-scrambled video information is output to the recording device 26. As a result, the Copy Free video information is recorded onto the DVD 1 in non-scrambled state.

Further, as shown in the third row, the fifth row, the sixth row or the seventh row of the control management table respectively, when there is a contradiction among the watermark, the copy protection code and the CMGS, the controller 20 recognizes that there has been input to the recording apparatus 10 video information that may have been altered illegally. In this case, the controller 20 outputs to the recording device 26 the record control signal WCS for showing the prohibition of the recording. As a result, the video information with the potential of the information having been altered illegally is not recorded onto the DVD 1. Therefore, according to the recording apparatus 10 of the present embodiment, it is possible to prevent the video information having the potential of illegal alteration from being copied.

IV. Reproducing Apparatus

Figure 9:
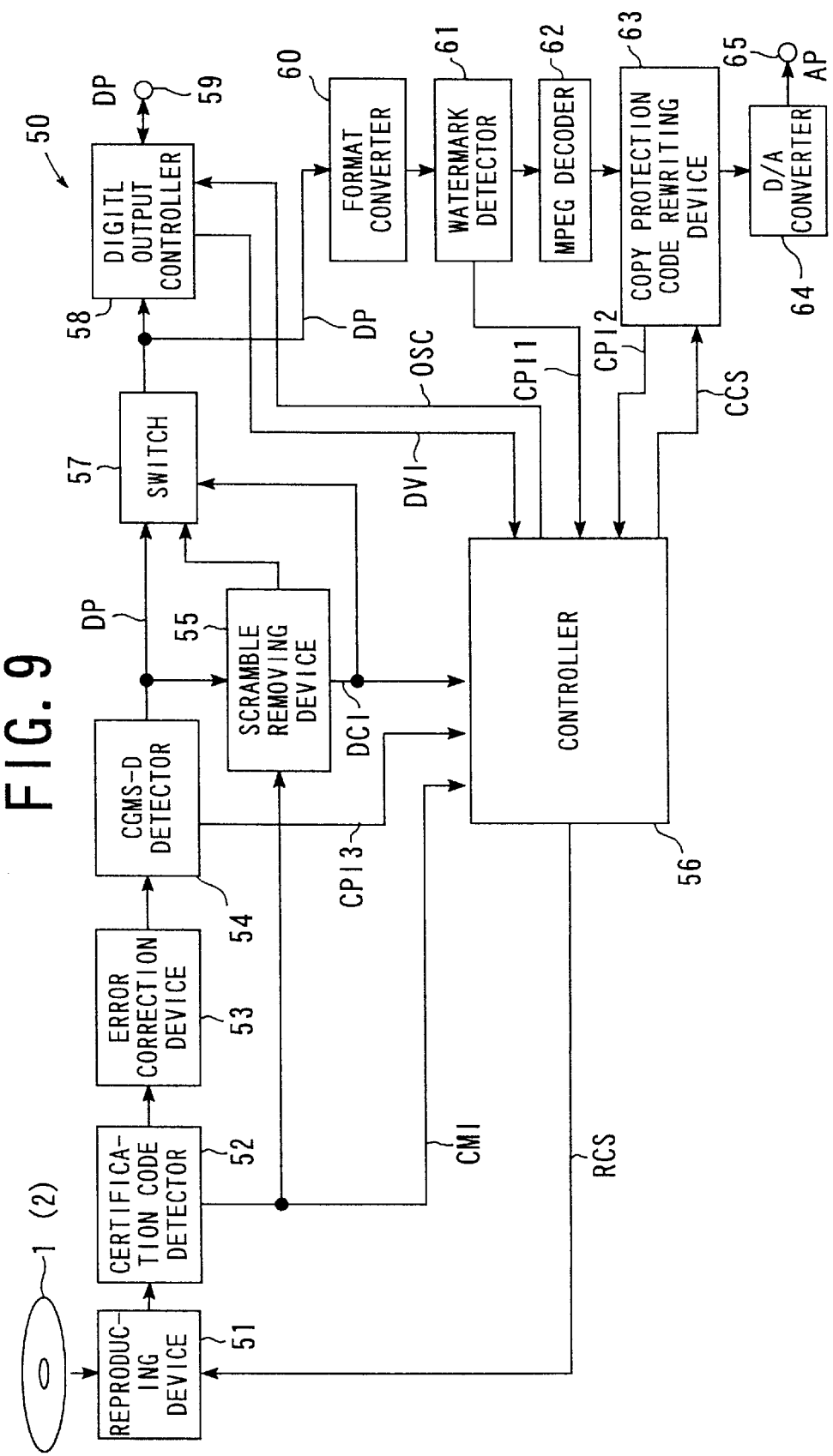
FIG. 9 is a block diagram for showing a reproducing apparatus according the embodiment of the present invention.

Referring to FIG. 9, the reproducing apparatus 50 of the recording/reproducing system 100 will be explained.

As shown in FIG. 9, the reproducing apparatus 50 is equipped with a reproducing device 51, a certification code detector 52, an error correction device 53, a CGMS-D detector 54, a scramble removing device 55, a controller 56, a switch 57, a digital output controller 58, a digital output terminal 59, a format converter 60, a watermark detector 61, an MPEG decoder 62, a copy protection code rewriting device 63, a digital-analog converter 64 and an analog output terminal 65.

When the controller 56 has permitted the reading, the reproducing device 51 reads out the digital video information DP recorded on a DVD, and outputs this digital video information DP to the certification code detector 52. On the other hand, when the controller 56 prohibits the reading, the reproducing device 51 does not read out the digital video information DP. The operation of the reproducing device 51 is controlled by a reading control signal RCS output from the controller 56.

The certification code detector 52 detects whether or not a certification code exists in the digital video information DP read out by the reproducing device 51. When the existence of the certification code has been detected, the certification code detector 52 reads out the certification code from within the digital video information DP, and outputs certification information CMI corresponding to this certification code to the controller 56. On the other hand, when the existence of the certification code has not been detected, the certification code detector 52 outputs to the controller 56 the information for showing that the certification code has not been detected. As described above, when the scramble removal information is included in the certification code, the certification code detector 52 outputs the scramble removal information to the scramble removing device 55.

The digital video information DP output from the certification code detector 52 is error corrected by the error correction device 53, and is then input to the CGMS-D detector 54. The CGMS-D detector 54 detects CGMS-D from the digital video information DP, and outputs CGMS information CPI3 corresponding to this CGMS-D to the controller 56.

The digital video information DP output from the CGMS-D detector 54 is output to the scramble removing device 55 and the switch 57 respectively. The scramble removing device 55 detects whether the digital video data included in the digital video information DP has been scrambled or not. When the digital video data has been scrambled, the scramble removing device 55 outputs detection information DCI for showing that scramble has been applied, to the controller 56 and the switch 57. At the same time, the scramble removing device 55 removes this scramble and outputs to the switch 57 the digital video information DP from which the scramble has been removed. As explained above, when the scramble removal information is included in the certification code, the scramble removing device 55 removes the scramble by using the scramble removal information output from the certification code detector 52. On the other hand, when the digital video information DP is not scrambled, the scramble removing device 55 outputs the detection information DCI for showing that the scramble has not been applied, to the controller 56 and the switch 57.

The switch 57 is a switch for changing over between the digital video information DP directly output from the CGMS-D detector 54 and the digital video information DP output from the CGMS-D detector 54 through the scramble removing device 55. The switch control of the switch 57 is carried out based on the detection information DCI output from the scramble removing device 55 and the like. Thus, when the digital video information DP has not been scrambled, the digital video information DP output from the CGMS-D detector 54 is output as it is to the digital output controller 58 through the switch 57. On the other hand, when the digital video information DP has been scrambled, the digital video information DP from which the scramble has been removed by the scramble removing device 55 is output to the digital output controller 58 through the switch 57.

The digital output controller 58 is for carrying out the digital output control of the reproducing apparatus 50. The output section of the digital output controller 58 is connected to the digital output terminal 59, and the digital output terminal 59 may be connected to an external apparatus (not shown) through a digital bus (not shown). The digital output controller 58 carries out bi-directional communications through the external apparatus and the digital bus, obtains type information DVI for showing the type of the external apparatus and outputs this type information DVI to the controller 56. This type information DVI is used for reproduction restriction control described later and executed by the controller 56. In the reproduction restriction control, the controller 56 outputs to the digital output controller 58 an output control signal OCS for permitting or prohibiting the digital video information DP to the external apparatus. When the controller 56 has permitted the output, the digital output controller 58 outputs from the reproducing apparatus 50 to the external apparatus the digital video information DP output through the switch 57 in the digital state as it is. On the other hand, when the controller 56 has prohibited the output, the digital output controller 58 does not output the digital video information DP to the external apparatus.

The digital video information DP output from the switch 57 is output to the format converter 60 as well as to the digital output controller 58. The format converter 60 converts the data format of the digital video information DP into a data format for an analog output. When the information read out from the DVD by the reproducing apparatus 51 is information for reproducing a moving picture, for example, sound information and others as well as the digital video information DP are included in the read-out information. In this case, the format converter 60 separates the digital video information DP from the sound information and others. Then, the sound information is output to sound processing circuit not shown.

The digital sound information DP with the converted data format is input to the watermark detector 61. The watermark detector 61 detects the watermark included in the digital video information DP, and outputs the watermark information CPI1 corresponding to this watermark to the controller 56.

The digital video information DP is decoded by a decoding system based on MPEG2 in the MPEG decoder 62, and a decoded result is input to the copy protection code rewriting device 63. When a change control signal CCS is output to the copy protection code rewriting device 63 from the controller 56, the copy protection code rewriting device 63 changes or rewrites the copy protection code included in the digital video information DP from One Copy to Never Copy. When the copy protection code included in the digital video information DP is necessary for the reproduction restriction control to be executed by the controller 56, the copy protection code rewriting device 63 detects a copy protection code before the rewriting, from the MPEG2-combined digital video information DP, and outputs the copy protection information CPI2 corresponding to this copy protection code to the controller 56.

The digital video information DP output from the copy protection code rewriting device 63 is converted from digital to analog information by the digital-analog converter 64, and a result is output to the outside from the analog output terminal 65 as the analog video information AP. With this arrangement, when a monitoring apparatus is connected to the analog output terminal 65, for example, a picture or a video image is displayed in the monitoring apparatus.

Figure 10:
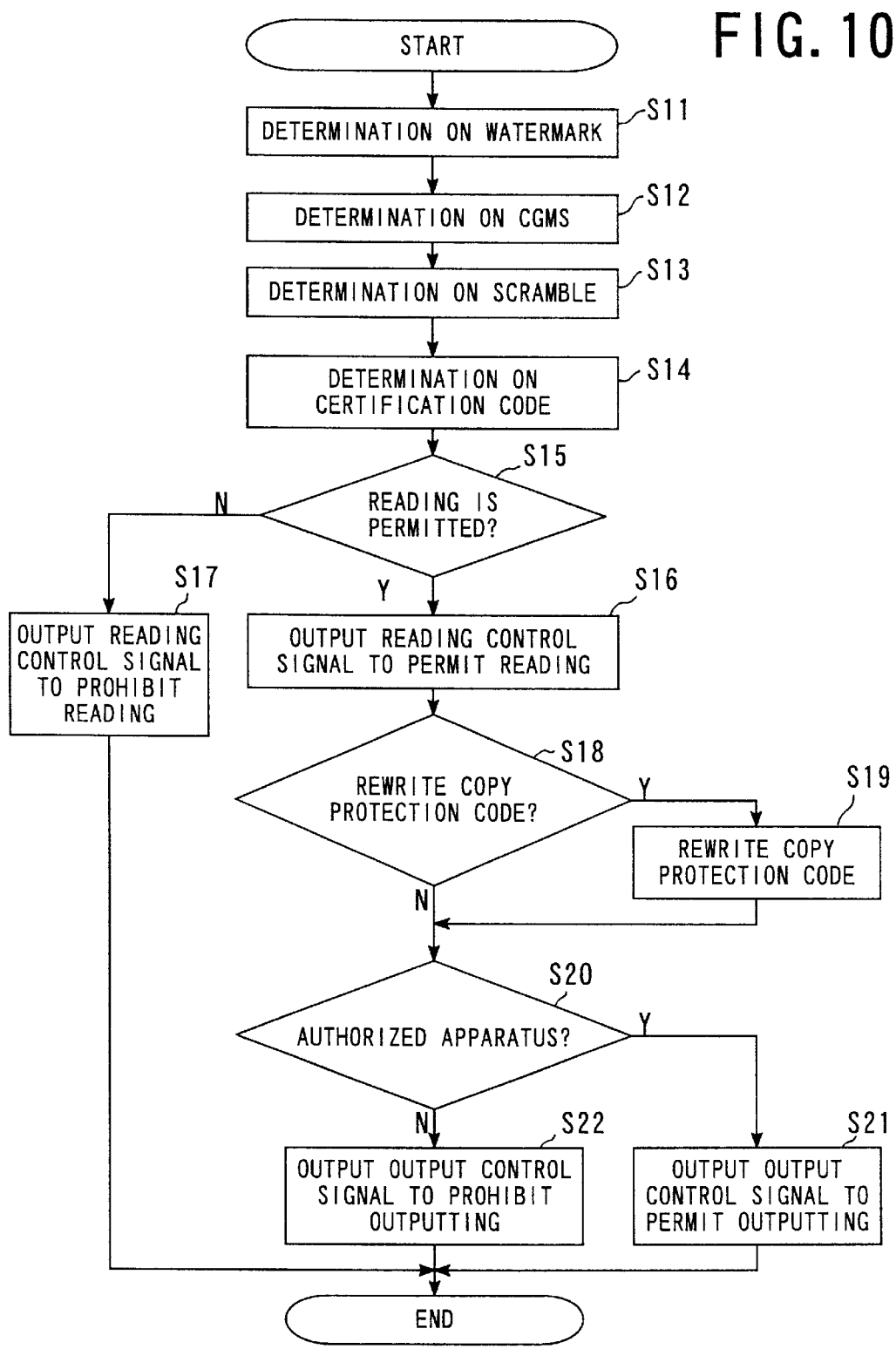
FIG. 10 is a flowchart for showing reproduction restriction control in the embodiment of the present invention.

Further, the controller 56 is equipped with a CPU, memories, etc., and carries out an overall control of the reproducing apparatus 50 and a reproduction restriction control as shown in FIG. 10.

Referring to FIG. 10, the reproduction restriction control to be carried out by the controller 56 will be explained below.

Firstly, the controller 56 outputs to the reproducing device 51 a reading control signal RCS for permitting the reading. Then, the reproducing device 51 starts the reading of the digital video information DP from a DVD. The controller 56 then executes the reproduction restriction control shown in FIG. 10.

In FIG. 10, the controller 56 determines whether the digital video information DP read out by the reproducing device 51 represents Never Copy, One Copy or Copy Free, based on the watermark information CPI1 output from the watermark detector 61 (step 11). Further, the controller 56 determines whether the digital video information DP read out by the reproducing device 51 represents Never Copy, One Copy or Copy Free, based on the CGMS information CPI3 output from the CGMS-D detector 54 (step 12). Further, the controller 56 determines whether the digital video data included in the digital video information DP read out by the reproducing device 51 has been scrambled or not, based on the detection signal DCI output from the scramble removing device 55 (step 13). Further, the controller 56 determines whether a certification code has been added to the digital video information DP read out by the reproducing device 51, based on the certification information CMI output from the certification code detector 52 (step 14).

Next, the controller 56 determines whether the reading of the digital video information DP by the reproducing device 51 is permitted or prohibited, based on a result of the determines in steps 11 to 14 (step 15).

When the determination has been made that the reading of the digital video information DP by the reproducing device 51 is permitted (step 15=YES), the controller 56 outputs to the reproducing device 51 the reading control signal RCS for showing the permission of the reading (step 16). Thus, the reproducing device 51 continues the reading of the digital control information DP. Further, the controller 56 determines whether it is necessary or not to change from One Copy to No More Copy the copy protection signal included in the digital video information DP read out by the reproducing device 51, based on results of the determines in steps 11 to 14 (step 18). When the determine has been made that it is necessary to change the copy protection code (step 18=YES), the controller 56 outputs to the copy protection code rewriting device 63 the change control signal CCS for instructing the change (or rewriting) of the copy protection code (step 19). As a result, the copy protection code rewriting device 63 changes from One Copy to No More Copy the copy protection code included in the digital video information DP read out from the reproducing device 51. Then, the digital video information DP with the changed copy protection code is converted into the analog video information AP by the digital-analog converter 64, and this analog video information AP is output to the outside from the analog output terminal 65. As explained above, when the digital video information DP read out from the reproducing device 51 has been scrambled, the scramble is removed by the scramble removing device 55.

On the other hand, in step 18, when the determination has been made that it is not necessary to change the copy protection code (step 18=NO), the controller 56 does not output the change control signal CCS for instructing the changing of the copy protection code. Thus, the copy protection code rewriting device 63 does not change the copy protection code included in the digital video information DP read out from the reproducing device 51. Then, this digital video information DP is converted into the analog video information AP by the digital-analog converter 64, and this analog video information AP is output to the outside as analog information from the analog output terminal 65.

Further, the controller 56 determines whether or not the type of the external apparatus connected to the digital output terminal 59 through the digital bus coincides with the type of an authorized apparatus registered in advance in the memory of the controller 56, based on the type information DVI output from the digital output controller 58 (step 20).

In the reproducing apparatus 50, there has been registered in advance in the memory of the controller 56 type information of authorized apparatuses that can receive the digital video information DP output from the reproducing apparatus 50 and that are not equipped with a function of recording this digital video information DP onto a recording medium. For example, as an authorized apparatus, a digital monitoring apparatus is registered in the memory of the controller 56.

Then, as a result of the determination in step 20, when the external apparatus connected to the digital output terminal 59 through the digital bus coincide with any one of the authorized apparatuses registered in advance in the memory of the controller 56 (step 20=YES), the controller 56 outputs to the digital output controller 58 the output control signal OCS for showing the permission of digital output of the digital video information DP (step 21). Thus, the digital output controller 58 outputs the digital video information DP from the digital output terminal 59 to the external apparatus. In this case, the digital video information DP read out by the reproducing device 51 is not only output as analog information from the analog output terminal 65, but is also output as digital information from the digital output terminal 59.

On the other hand, as a result of the determination in step 20, when the external apparatus connected to the digital output terminal 59 through the digital bus do not coincide with the any one of the authorized apparatuses registered in advance in the memory of the controller 56 (step 20=NO), the controller 56 outputs to the digital output controller 58 the output control signal OCS for showing the prohibition of digital output of the digital video information DP (step 22). Thus, the digital video information DP read out by the reproducing device 51 is output as analog information but is not output as digital information.

Further, in step 15, when the determination has been made that the reading of the digital video information DP by the reproducing device 51 is prohibited (step 15=NO), the controller 56 outputs to the reproducing device 51 the reading control signal RCS for showing the prohibition of the reading (step 17). Thus, the reading of the digital video information DP by the reproducing device 51 is stopped. Accordingly, the digital video information DP is not output as either analog information or digital information.

Referring next to FIGS. 11A and 11B, the statuses of the watermark, the CGMS, etc. included in the digital video information DP read out by the reproducing device 51 and the controls executed to these statuses by the controller 56 will be explained.

A control management table for showing a relationship between the statuses of the watermark, CGMS, etc. and the controls executed to these statuses by the controller 56 is shown in FIGS. 11A and 11B. The table shown in FIG. 11A is the left part of the control management table. The table shown in FIG. 11B is the right part of the control management table. Each part of the table has 19 rows which are numbered. Between FIGS. 11A and 11B, the rows with the same number correspond to each other. The control management table is stored in the memory of the controller 56, and the controller 56 carries out the reproduction restriction control by using this control management table.

As shown in the third row of the control management table in FIGS. 11A and 11B, when the watermark represents Never Copy and the CGMS represents Never Copy, the controller 56 recognizes that the digital video information DP read out from a DVD is Never Copy. Further, as shown in the third row of the control management table, when the digital video information DP has not been scrambled and a certification code does not exist in the digital video information DP, the controller 56 recognizes that the digital video information DP read out from the DVD is information recorded in a read-only DVD. Further, as shown in the third row of the control management table, when the external apparatus connected to the digital output terminal 59 of the reproducing apparatus 50 do not coincide with any one of the authorized apparatuses, the controller 56 recognizes that there is a potential that the external apparatus has a function of recording the digital video information DP in the digital state. In this case, the controller 56 outputs to the reproducing device 51 the reading control signal RCS for showing the permission of the reading, and at the same time, outputs to the digital output controller 58 the output control signal OCS for showing the prohibition of digital output of the digital video information DP. Thus, the Never Copy digital video information DP is converted into the analog video information AP and is output as analog information, but the Never Copy digital video information DP is not output as digital information. Accordingly, the audience can watch a picture or a video image of the Never Copy digital video information DP in the analog monitoring apparatus connected to the analog output terminal 65 of the reproducing apparatus 50, for example. However, the audience cannot copy the Never Copy digital video information DP by digital transmission by connecting a recording apparatus to the digital output terminal 59 of the reproducing apparatus 50. As explained above, according to the reproducing apparatus 50 of the present embodiment, it is possible to prevent the Never Copy digital video information DP from being copied by digital transmission.

On the other hand, as shown in the fourth row of the control management table, when the external apparatuses connected to the digital output terminal 59 of the reproducing apparatus 50 coincide with any one of the authorized apparatuses, the controller 56 recognizes that the external apparatus is not equipped with a function of recording the digital video information DP as digital information. In this case, the controller 56 outputs to the digital output controller 58 the output control signal OCS for showing the permission of digital output of the digital video information DP. Thus, the Never Copy digital video information DP is converted into the analog video information AP and is output as analog information, and at the same time, the information is output as digital information. Accordingly, when a digital display apparatus is connected to the digital output terminal 59 of the reproducing apparatus 50, for example, the audience can watch a picture or a video image of the Never Copy digital video information DP in this digital display apparatus.

Further, as shown in the seventh row of the control management table, when the watermark represents One Copy and the CGMS represents Never Copy, the controller 56 recognizes that the digital video information DP read out from a DVD is No More Copy. Further, as shown in the seventh row of the control management table, when the digital video information DP has been scrambled and a certification code exists within the digital video information DP, the controller 56 recognizes that the digital video information DP read out from the DVD is information recorded by the recording apparatus 10. Further, as shown in the seventh row of the control management table, when the external apparatus connected to the digital output terminal 59 of the reproducing apparatus 50 do not coincide with any one of the authorized apparatuses, the controller 56 recognizes that there is a potential that the external apparatus has a function of recording the digital video information DP in the digital state. In this case, the controller 56 outputs to the reproducing device 51 the reading control signal RCS for showing the permission of the reading, outputs to the digital output controller 58 the output control signal OCS for showing the prohibition of digital output of the digital video information DP, and outputs the change control signal CCS to the copy protection code rewriting device 63. Thus, the copy protection code of the No More Copy digital video information DP is converted from One Copy to No More Copy, and this information is converted into the analog video information AP and is output as analog information. Accordingly, the audience cannot copy the No More Copy analog video information AP by connecting the recording apparatus 10 to the analog output terminal 65 of the reproducing device 50. This is because the recording apparatus 10 detects the copy protection code changed into No More Copy, and does not carry out the recording. As explained above, according to the recording/reproducing system 100 of the present embodiment, it is possible to prevent the No More Copy digital video information DP from being copied by analog transmission.

On the other hand, as shown in the eighth row of the control management table, when the external apparatus connected to the digital output terminal 59 of the reproducing apparatus 50 coincide with any one of the authorized apparatuses, the controller 56 recognizes that the external apparatus is not equipped with a function of recording the digital video information DP as digital information. In this case, the controller 56 outputs to the digital output controller 58 the output control signal OCS for showing the permission of digital output of the digital video information DP. Thus, the No More Copy digital video information DP is converted into the analog video information AP, and is output as analog information, and at the same time, the information is output as digital information.

Further, as shown in the nineteenth row of the control management table, when the watermark and the CGMS represent Copy Free respectively, the controller 56 recognizes that the digital video information DP read out from a DVD is Copy Free. Further, as shown in the nineteenth row of the control management table, when the digital video information DP has not been scrambled, the controller 56 recognizes that the digital video information DP read out from the DVD is normal. In this case, the controller 56 outputs to the reproducing device 51 the reading control signal RCS for showing the permission of the reading, and outputs to the digital output controller 58 the output control signal OCS for showing the permission of digital output of the digital video information DP. Thus, the Copy Free digital video information DP is converted into the analog video information AP, and is output as analog information, and at the same time, the information is output as digital information. Therefore, according to the reproducing apparatus 50 of the present embodiment, it is possible to output the Copy Free digital video information DP in two kinds of states of analog information and digital information.

Further, as shown in the tenth row of the control management table, when the watermark represents One Copy and the CGMS represents Never Copy, the controller 56 recognizes that the digital video information DP read out from a DVD is No More Copy. However, as shown in the tenth row of the control management table, when the digital video information DP has not been scrambled, the controller 56 recognizes that this digital video information DP is information recorded on the DVD by a non-compliant recording apparatus other than the recording apparatus 10. The non-compliant recording apparatus refers to other recording apparatus which is not based on a predetermined rule on the copy protection that prescribes the watermark included in the digital video information DP or analog video information AP, the copy protection code and the CGMS together with their respective dispositions, the decision method, the scramble processing method and the scramble removing method, and the like. In this case, the controller 56 outputs to the reproducing device 51 the reading control signal RCS for prohibiting the reading. Thus, the digital video information DP recorded by the non-compliant recording apparatus is neither reproduced nor output. Accordingly, a person who has copied the digital video information DP by the non-compliant recording apparatus cannot reproduce this copied digital video information DP by the reproducing apparatus 50, and can obtain no benefit from the copying. This person feels inconvenience. As a result, it is possible to reduce unlimited copying of the digital video information DP or analog video information AP carried out by the non-compliant recording apparatus or non-compliant reproducing apparatus.

Further, as shown in the first row of the control management table, when the digital video information DP has been scrambled although the watermark represents Never Copy; or as shown in the second row, when a certification code exists in the digital video information DP although the watermark represents Never Copy; or as shown in the fifth row, when there is a contradiction between the watermark and the CGMS; or as shown in the ninth row, when a certification code does not exist in the digital video information DP although the digital video information DP has been scrambled; the controller 56 recognizes that the digital video information DP with a potential of the information having being altered illegally has been recorded on the DVD. In this case, the controller 56 outputs to the reproducing device 51 the reading control signal RCS for prohibiting the reading. Thus, it is possible to prevent the digital video information DP having the potential of illegal alteration from being reproduced and output to the outside from the reproducing apparatus 50.

In the fifteenth to sixteenth rows of the control management table, the watermark represents Copy Free and the CGMS represents Never Copy. In this case, the controller 56 carries out controls similar to those in the third to fourth rows of the control management table.

V. Copy Restriction by the Recording/reproducing System

According to the recording/reproducing system 100 of the present embodiment, it is possible to properly restrict the copying of the digital video information DP carried out by using the recording apparatus 10 and the reproducing apparatus 50.

Figure 12:
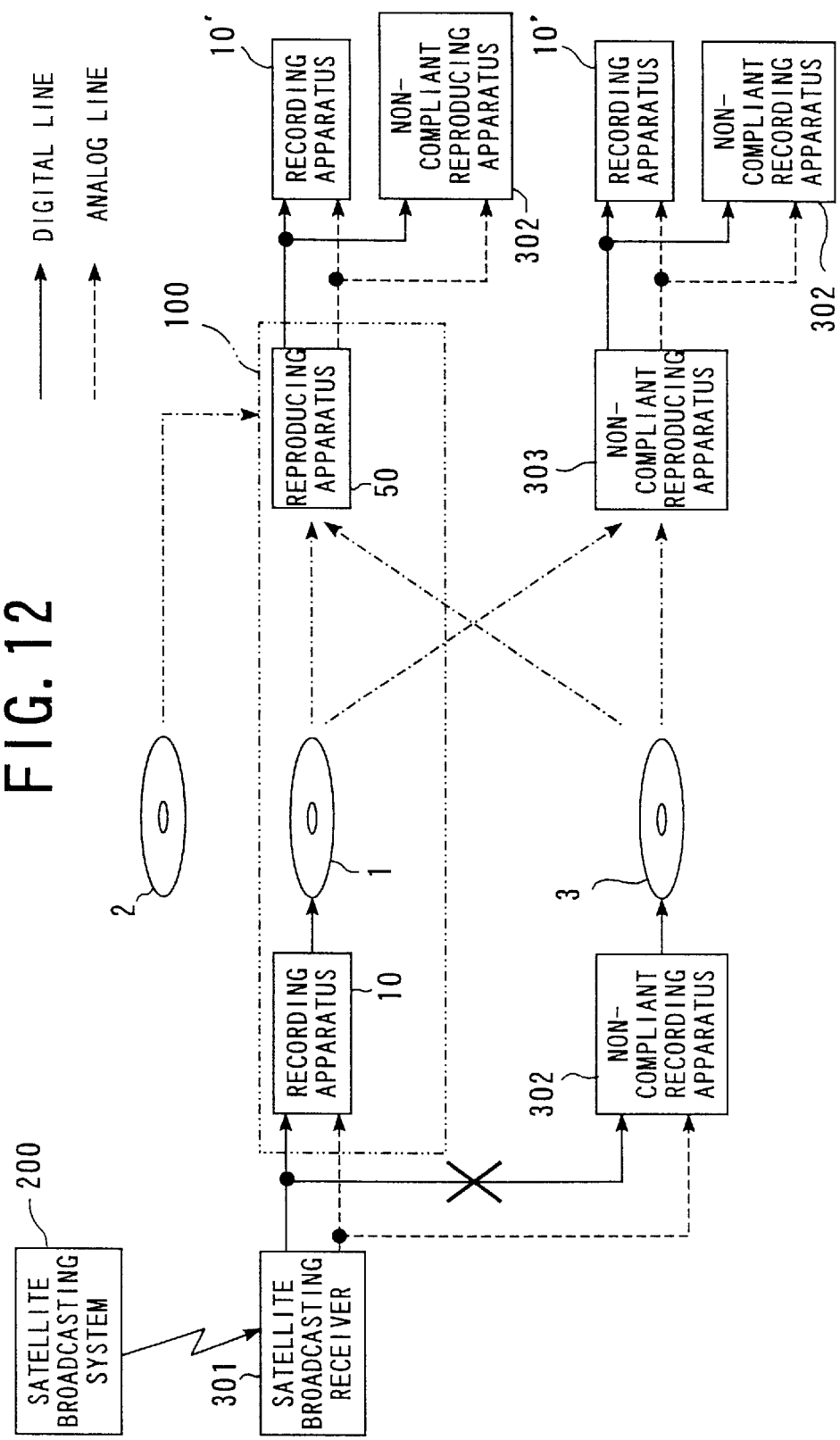
FIG. 12 is a block diagram for showing a recording/reproducing system, a satellite broadcasting system, a non-compliant recording apparatus, a non-compliant reproducing apparatus, etc. in the embodiment of the present invention.

As shown in FIG. 12, it is possible to restrict properly the copying of the digital video information DP carried out, for example, in the following routes: (1) Take the digital video information DP transmitted from the satellite broadcasting system 200 into the recording apparatus 10 through the satellite broadcasting receiver 301; (2) Record this digital video information DP or the analog video information AP converted by the satellite broadcasting receiver 301, onto the DVD 1 by the recording apparatus 10; (3) Reproduce by the reproducing apparatus 50 the digital video information DP recorded on the DVD 1; and (4) Further record the digital video information DP or analog video information AP output from the reproducing apparatus 50, onto other DVD by another recording apparatus 10' connected to the reproducing apparatus 50.

Particularly, when the No More Copy digital video information DP is converted into the analog video information AP and this analog information is output from the reproducing apparatus 50 to the recording apparatus 10' connected to the output terminal 65 of the reproducing apparatus 50, the copy protection code included in the No More Copy digital video information DP is changed from One Copy to No More Copy by the reproducing apparatus 50. Therefore, it is possible to prevent the No More Copy digital video information DP from being copied by the recording apparatus 10'.

Further, according to the recording apparatus 10 of the present embodiment, One Copy digital video information DP is recorded onto the DVD 1 after the information has been scrambled. Accordingly, it is possible to prevent the digital video information DP, which has been changed from One Copy to No More Copy by the recording onto the DVD 1, from being reproduced by the non-compliant reproducing apparatus not equipped with the copy protection function. Therefore, it is possible to prevent the No More Copy digital video information DP from being copied by this non-compliant reproducing apparatus.

When, for example, as shown in FIG. 12, an attempt has been made by a person to (1) take the digital video information DP transmitted from the satellite broadcasting system 200 into the recording apparatus 10 through the satellite broadcasting receiver 301, (2) record this digital video information DP or the analog video information AP converted by the satellite broadcasting receiver 301, onto the DVD 1 by the recording apparatus 10, and (3) reproduce by a non-compliant reproducing apparatus 303 the digital video information DP recorded on the DVD 1, the non-compliant reproducing apparatus 303 cannot remove the scramble applied to the digital video information DP. Therefore, it is not possible to reproduce this digital video information DP.

Further, according to the reproducing apparatus 50 of the present embodiment, the reproducing apparatus 50 is so structured that, when an attempt is made to reproduce No More Copy digital video information DP, the reproducing apparatus 50 recognizes that this digital video information DP is not the information recorded by the recording apparatus 10 when this digital video information DP has not been scrambled or when a certification code is not added to this digital video information DP. Thus, the reproducing apparatus 50 does not reproduce this digital video information DP. Therefore, there are the following effects. As a person who has copied the digital video information DP onto a DVD by the non-compliant recording apparatus cannot reproduce the copied digital video information DP by the reproducing apparatus 50, he or she cannot obtain any benefit from the copying of this digital video information DP, and feels inconvenience. As a result, it is possible to reduce unlimited copying of the digital video information DP or analog video information AP carried out by the non-compliant recording apparatus or non-compliant reproducing apparatus.

When, for example, as shown in FIG. 12, an attempt has been made by a person to (1) take the digital video information DP transmitted from the satellite broadcasting system 200 into a non-compliant recording apparatus 302 through the satellite broadcasting receiver 301, (2) record this digital video information DP or the analog video information AP converted by the satellite broadcasting receiver 301, onto a DVD3 by the non-compliant recording apparatus 302, and (3) reproduce by the reproducing apparatus 50 the digital video information DP recorded on the DVD3, the reproducing apparatus 50 does not reproduce this digital video information DP. As a result, the audience cannot watch by the reproducing apparatus 50 a moving picture transmitted from the satellite broadcasting system 200 even though the audience has recorded this moving picture onto the DVD3 by using the non-compliant recording apparatus 302.

Further, according to the recording apparatus 10 and the reproducing apparatus 50 of the present embodiment, as the recording or reproduction of the digital video information DP is prohibited when there is a contradiction among the watermark, the copy protection code, the CGMS, etc. included in the digital video information DP, it is possible to prevent the digital video information DP having the potential of illegal alteration from being recorded, reproduced or copied.

Further, the satellite broadcasting receiver 301 is so structured as to determine the status of the watermark included in the digital video information DP received from the satellite broadcasting system 200 and the types of external apparatuses connected to the digital output terminal of the satellite broadcasting receiver 301, and control the digital output of the received digital video information DP based on results of these determinations. Therefore, as shown in FIG. 12, it is possible to prevent the One Copy digital video information DP from being output to the non-compliant recording apparatus in the digital state and being copied by the digital transmission of the digital video information DP. Although the copying of One Copy digital video information DP is permitted only once, when this One Copy digital video information DP has been recorded by the non-compliant recording apparatus, there is considered a case where the copy protection of this digital video information DP cannot be done properly thereafter. Accordingly, the copying of One Copy digital video information DP by the non-compliant recording apparatus is prohibited.

In the above-described record restriction control of the recording apparatus 10 and the reproduction restriction control of the reproducing apparatus 50, determines may be made by replacing the watermark and the CGMS.

Further, in the above-described embodiment, although determinations are made by using the three kinds of identification codes of the watermark, the copy protection code and the CGMS, the present invention is not limited to the above. Determinations may also be made by using two kinds of identification codes of the watermark and the copy protection code, for example.

Further, in the above-described embodiment, although determinations are not made based on the copy protection code in the reproduction restriction control of the reproducing apparatus 50, the present invention is not limited to this. For example, it may also be arranged such that a copy protection code before being changed by the copy protection code rewriting device 63 is read into the controller 56 and the controller 56 determines whether the copy protection code represents One Copy or not.

Further, in the above-described embodiment, description has been made of the case as an example where the scramble removing device 55 directly detects whether the digital video information DP has been scrambled or not, thereby to determine whether the digital video information DP has been scrambled or not. However, the present invention is not limited to this, and it may also be arranged such that a determination is made whether or not scramble removal information is added to the certification information included in the digital video information DP, thereby to recognize whether or not the digital video information DP has been scrambled or not.

Further, as the recording apparatus 10 and the reproducing apparatus 50 of the present embodiment are mutually independent apparatuses, it is possible to dispose the recording apparatus 10 and the reproducing apparatus 50 at quite different places. However, the present invention is not limited to this, and the recording apparatus 10 and the reproducing apparatus 50 may be provided within a single casing. Further, by making common those parts of the recording apparatus 10 and the reproducing apparatus 50 where it is possible to do so, the recording apparatus 10 and the reproducing apparatus 50 may be integrated together.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-204328 filed on Jul. 3, 1998 including the specification, claims, drawings and summary is incorporated herein by reference in its entirety.

What is claimed is:

1. A system comprising a recording apparatus for recording record information onto a recording medium as digital data and a reproducing apparatus for reading the record information from the recording medium and outputting the read record information in order to reproduce the record information recorded on the recording medium, the record information including: image information which represents an image or a picture; a first identification information which represents any one of never copy, one copy and copy free; and a second identification information which represents any one of at least the never copy and the one copy, the never copy indicating that copying of the information is prohibited, the one copy indicating that the copying of the information is permitted only once, the copy free indicating that the copying of the information is permitted, the recording apparatus comprising:
- an input device for inputting the record information;
- a first recording determination device for determining whether the first identification information included in the input record information indicates the never copy, the one copy or the copy free;
- a second recording determination device for determining whether the second identification information included in the input record information indicates the never copy or the one copy;
- a recording control device for determining on the basis of determinations of the first recording determination device and the second recording determination device whether recording the input record information onto the recording medium is permitted or prohibited;
- a recording device for recording the input record information onto the recording medium in accordance with a determination of the recording control device;
- an encryption control device for determining on the basis of determinations of the first recording determination device and the second recording determination device whether or not the input record information is to be encrypted; and
- an encryption device for encrypting the input record information in accordance with a determination of the encryption control device, the reproducing apparatus comprising:
- a read device for reading the record information from the recording medium;
- a first reproduction determination device for determining whether the first identification information included in the read record information indicates the never copy, the one copy or the copy free;
- a second reproduction determination device for determining whether or not the read record information is encrypted by the recording apparatus;
- an output control device for determining on the basis of determinations of the first reproduction determination device and the second reproduction determination device whether outputting the read record information is permitted or prohibited;
- an output device for outputting the read record information in accordance with a determination of the output control device;
- a decryption control device for determining on the basis of a determination of the second reproduction determination device whether or not the read record information is to be decrypted;
- a decryption device for decrypting the read record information in accordance with a determination of the decryption control device;
- a changing control device for determining on the basis of determinations of the first reproduction determination device and the second reproduction determination device whether or not the second identification information is to be changed such that the second identification information indicates the never copy; and
- a changing device for changing the second identification information such that the second identification information indicates the never copy, in accordance with a determination of the changing control device.

2. The system according to claim 1, wherein:
- the output control device determines that outputting the read record information is permitted, when the first reproduction determination device determines that the first identification information indicates the one copy and the second reproduction determination device determines that the read record information is encrypted;
- the output control device determines that outputting the read record information is permitted, when the first reproduction determination device determines that the first identification information indicates the copy free; and
- the output control device determines that outputting the read record information is prohibited, when the first reproduction determination device determines that the first identification information indicates the one copy and the second reproduction determination device determines that the read record information is not encrypted.

3. The system according to claim 1, wherein the changing control device determines that the second identification information is to be changed such that the second identification information indicates the never copy, when the first reproduction determination device determines that the first identification information indicates the one copy and the second reproduction determination device determines that the read record information is encrypted.

4. The system according to claim 1, wherein:
- the output control device determines that outputting the read record information is prohibited, when the first reproduction determination device determines that the first identification information indicates the never copy and the second reproduction determination device determines that the read record information is encrypted;
- the output control device determines that outputting the read record information is prohibited, when the first reproduction determination device determines that the first identification information indicates the one copy and the second reproduction determination device determines that the read record information is not encrypted; and
- the output control device determines that outputting the read record information is prohibited, when the first reproduction determination device determines that the first identification information indicates the copy free and the second reproduction determination device determines that the read record information is encrypted.

5. The system according to claim 1, wherein:
- the recording control device determines that recording the input record information is prohibited, when the first recording determination device determines that the first identification information indicates the never copy;
- the recording control device determines that recording the input record information is prohibited, when the first recording determination device determines that the first identification information indicates the one copy and the second recording determination device determines that the second identification information indicates the never copy;
- the recording control device determines that recording the input record information is permitted, when the first recording determination device determines that the first identification information indicates the one copy and the second recording determination device determines that the second identification information indicates the one copy; and the recording control device determines that recording the input record information is permitted, when the first recording determination device determines that the first identification information indicates the copy free.

6. The system according to claim 1, wherein the encryption control device determines that the read record information is to be encrypted, when the first recording determination device determines that the first identification information indicates the one copy and the second recording determination device determines that the second identification information indicates the one copy.

7. The system according to claim 1, wherein the reproducing apparatus further comprises:

a digital-analog converting device for converting the record information output by the output device into an analog signal; and an analog output device for outputting the analog signal.

8. The system according to claim 7, wherein the changing control device determines whether or not the second identification information is to be changed, only when the record information is to be output as the analog signal.

9. The system according to claim 1, wherein:

the output device outputs the read record information as a digital signal to an external apparatus;

the reproducing apparatus further comprises an external apparatus determination device for determining whether or not the external apparatus is authorized;

the output control device determines that outputting the read record information is prohibited, when the first reproduction determination device determines that the first identification information indicates never copy and the external apparatus determination device determines that the external apparatus is not authorized; and the output control device determines that outputting the read record information is prohibited, when the first reproduction determination device determines that the first identification information indicates one copy and the external apparatus determination device determines that the external apparatus is not authorized.

10. The system according to claim 1, wherein:

the record information further includes a third identification information which represents any one of the never copy, the one copy and the copy free;

the recording apparatus further comprises a third recording determination device for determining whether the third identification information included in the input record information indicates the never copy, the one copy or the copy free; and the recording control device determines on the basis of determinations of the first recording determination device, the second recording determination device and the third recording determination device whether recording the input record information onto the recording medium is permitted or prohibited.

11. The system according to claim 10, wherein:

the reproducing apparatus further comprises a third reproduction determination device for determining whether the third identification information included in the read record information indicates the never copy, the one copy or the copy free; and the output control device determines on the basis of determinations of the first reproduction determination device, the second reproduction determination device and the third reproduction determination device whether outputting the read record information is permitted or prohibited.

12. The system according to claim 1 further comprising a receiving apparatus for receiving the record information transmitted from an information generation source and outputting the received record information to the recording apparatus, the receiving apparatus comprising:

an information output device for outputting the received record information to the recording apparatus as a digital signal;

an information determination device for determining whether the first identification information included in the received record information indicates the never copy, the one copy or the copy free;

a recording apparatus determination device for determining whether or not the recording apparatus is authorized;

an information output control device for determining on the basis of determinations the information determination device and the recording apparatus determination device whether outputting the received record information is permitted or prohibited, wherein the information output control device determines that outputting the received record information is permitted, when the information determination device determines that the first identification information indicates one copy and the recording apparatus determination device determines that the recording apparatus is authorized.

13. The system according to claim 1, wherein:

the first identification information is either one of a first value representing the never copy and a second value representing the one copy;

the first recording determination device determines that the first identification information indicates the copy free when neither the first value nor the second value is included in the input record information; and the first reproduction determination device determines that the first identification information indicates the copy free when neither the first value nor the second value is included in the read record information.

14. The system according to claim 1, wherein:

the second identification information is an identification value representing the one copy;

the second recording determination device determines that the second identification indicates the never copy when the identification value is not included in the input record information.

15. The system according to claim 1, wherein the first identification information is a watermark to be embedded in the image or the picture.

16. The system according to claim 1, wherein the second identification information is an identification code to be embedded in a peripheral portion of the image or the picture.

17. The system according to claim 10, wherein the third identification information is CGMS (Copy Generation Management System) information.

18. A system comprising a recording apparatus for recording record information onto a recording medium as digital data and a reproducing apparatus for reading the record information from the recording medium and outputting the read record information in order to reproduce the record information recorded on the recording medium, the record information including: image information which represents an image or a picture; a first identification information which represents any one of never copy, one copy and copy free; and a second identification information which represents any one of at least the never copy and the one copy, the never copy indicating that copying of the information is prohibited, the one copy indicating that the copying of the information is permitted only once, the copy free indicating that the copying of the information is permitted, the recording apparatus comprising:
an input device for inputting the record information;
a first recording determination device for determining whether the first identification information included in the input record information indicates the never copy, the one copy or the copy free;
a second recording determination device for determining whether the second identification information included in the input record information indicates the never copy or the one copy;
a recording control device for determining on the basis of determinations of the first recording determination device and the second recording determination device whether recording the input record information onto the recording medium is permitted or prohibited;
a recording device for recording the input record information onto the recording medium in accordance with a determination of the recording control device;
an encryption control device for determining on the basis determinations of the first recording determination device and the second recording determination device whether or not the input record information is to be encrypted;
an encryption device for encrypting the input record information in accordance with a determination of the encryption control device; and
a certification information adding device for adding a certification information to the input record information, the certification information indicating that the input record information is recorded by the recording apparatus, the reproducing apparatus comprising:
a read device for reading the record information from the recording medium;
a first reproduction determination device for determining whether the first identification information included in the read record information indicates the never copy, the one copy or the copy free;
a second reproduction determination device for determining whether or not the certification information is included in the read record information;
an output control device for determining on the basis of determinations of the first reproduction determination device and the second reproduction determination device whether outputting the read record information is permitted or prohibited;
an output device for outputting the read record information in accordance with a determination of the output control device;
a decryption control device for determining on the basis of a determination of the second reproduction determination device whether or not the read record information is to be decrypted;
a decryption device for decrypting the read record information in accordance with a determination of the decryption control device;
a changing control device for determining on the basis of determinations of the first reproduction determination device and the second reproduction determination device whether or not the second identification information is to be changed such that the second identification information indicates the never copy; and
a changing device for changing the second identification information such that the second identification information indicates the never copy, in accordance with a determination of the changing control device.

19. An apparatus for recording record information onto a recording medium as digital data, the record information including: image information which represents an image or a picture; a first identification information which represents any one of never copy, one copy and copy free; and a second identification information which represents any one of at least the never copy and the one copy, the never copy indicating that copying of the information is prohibited, the one copy indicating that the copying of the information is permitted only once, the copy free indicating that the copying of the information is permitted, the apparatus comprising:
an input device for inputting the record information;
a first recording determination device for determining whether the first identification information included in the input record information indicates the never copy, the one copy or the copy free;
a second recording determination device for determining whether the second identification information included in the input record information indicates the never copy or the one copy;
a recording control device for determining on the basis of determinations of the first recording determination device and the second recording determination device whether recording the input record information onto the recording medium is permitted or prohibited;
a recording device for recording the input record information onto the recording medium in accordance with a determination of the recording control device;
an encryption control device for determining on the basis determinations of the first recording determination device and the second recording determination device whether or not the input record information is to be encrypted;
an encryption device for encrypting the input record information in accordance with a determination of the encryption control device; and
a certification information adding device for adding a certification information to the input record information, the certification information indicating that the input record information is recorded by the apparatus.

20. An apparatus for reading record information from the recording medium on which the record information is recorded and outputting the read record information in order to reproduce the record information, the record information including: image information which represents an image or a picture; a first identification information which represents any one of never copy, one copy and copy free; and a second identification information which represents any one of at least the never copy and the one copy, the never copy indicating that copying of the information is prohibited, the one copy indicating that the copying of the information is permitted only once, the copy free indicating that the copying of the information is permitted, the apparatus comprising:
a read device for reading the record information from the recording medium;
a first reproduction determination device for determining whether the first identification information included in the read record information indicates the never copy, the one copy or the copy free;

a second reproduction determination device for determining whether or not the read record information is encrypted by the recording apparatus;

an output control device for determining on the basis of determinations of the first reproduction determination device and the second reproduction determination device whether outputting the read record information is permitted or prohibited;

an output device for outputting the read record information in accordance with a determination of the output control device;

a decryption control device for determining on the basis of a determination of the second reproduction determination device whether or not the read record information is to be decrypted;

a decryption device for decrypting the read record information in accordance with a determination of the decryption control device;

a changing control device for determining on the basis of determinations of the first reproduction determination device and the second reproduction determination device whether or not the second identification information is to be changed such that the second identification information indicates the never copy; and a changing device for changing the second identification information such that the second identification information indicates the never copy, in accordance with a determination of the changing control device.

21. The apparatus according to claim 20 further comprising:

a digital-analog converting device for converting the record information output by the output device into an analog signal; and an analog output device for outputting the analog signal.

22. The apparatus according to claim 21, wherein the changing control device determines whether or not the second identification information is to be changed, only when the record information is to be output as the analog signal.

23. The apparatus according to claim 20, wherein:

the output device outputs the read record information as a digital signal to an external apparatus;

the apparatus further comprises an external apparatus determination device for determining whether or not the external apparatus is authorized;

the output control device determines that outputting the read record information is prohibited, when the first reproduction determination device determines that the first identification information indicates never copy and the external apparatus determination device determines that the external apparatus is not authorized; and the output control device determines that outputting the read record information is prohibited, when the first reproduction determination device determines that the first identification information indicates one copy and the external apparatus determination device determines that the external apparatus is not authorized.

24. An apparatus for reading record information from a recording medium on which the record information is recorded and outputting the read record information to reproduce the record information, the record information including, image information which represents an image or a picture, a first identification information which represents any one of never copy, one copy and copy free, and a second identification information which represents any one of at least the never copy and the one copy, certification information which represents that the image information, the first identification information, and the second identification information are recorded by a recording apparatus provided with an encryption device, when the image information, the first identification information, and the second identification information are recorded by the recording apparatus, the never copy indicating that copying of the information is prohibited, the one copy indicating that the copying of the information is permitted only once, the copy free indicating that the copying of the information is permitted, the apparatus comprising:

a read device for reading the record information from the recording medium;

a first reproduction determination device for determining whether the first identification information included in the read record information indicates the never copy, the one copy or the copy free;

a second reproduction determination device for determining whether the read record information is encrypted by the recording apparatus;

a third reproduction determination device for determining whether the certification information is included in the read record information;

an output control device for determining on the basis of determinations of the first reproduction determination device and the second reproduction determination device whether outputting the read record information is permitted or prohibited;

an output device for outputting the read record information in accordance with a determination of the output control device;

a decryption control device for determining on the basis of a determination of the second reproduction determination device whether the read record information is to be decrypted;

a decryption device for decrypting the read record information in accordance with a determination of the decryption control device;

a changing control device for determining on the basis of determinations of the first reproduction determination device and the second reproduction determination device whether the second identification information is to be changed such that the second identification information indicates the never copy; and a changing device for changing the second identification information such that the second identification information indicates the never copy, in accordance with a determination of the changing control device.

25. The apparatus according to claim 24 further comprising a digital-analog converting device for converting the record information output by the output device into an analog signal, and an analog output device for outputting the analog signal.

26. The apparatus according to claim 25, wherein the changing control device determines whether the second identification information is to be changed, only when the record information is to be output as the analog signal.

27. The apparatus according to claim 24, wherein:

the output device outputs the read record information as a digital signal to an external apparatus;

the apparatus further comprises an external apparatus determination device for determining whether or not the external apparatus is authorized;

the output control device determines that outputting the read record information is prohibited, when the first reproduction determination device determines that the first identification information indicates never copy and the external apparatus determination device determines that the external apparatus is not authorized; and the output control device determines that outputting the read record information is prohibited, when the first reproduction determination device determines that the first identification information indicates one copy and the external apparatus determination device determines that the external apparatus is not authorized.

\* \* \* \* \*